United States Patent
Hageman

Patent Number: 5,899,067
Date of Patent: May 4, 1999

[54] HYDRAULIC ENGINE POWERED BY INTRODUCTION AND REMOVAL OF HEAT FROM A WORKING FLUID

[76] Inventor: Brian C. Hageman, 4108 E. Beryl La., Phoenix, Ariz. 85228

[21] Appl. No.: 08/701,222

[22] Filed: Aug. 21, 1996

[51] Int. Cl.⁶ ................................................ F01B 29/08
[52] U.S. Cl. ................................................. 60/516; 60/530
[58] Field of Search ............................ 60/516, 525, 530, 60/531

[56] References Cited

U.S. PATENT DOCUMENTS

| | | | |
|---|---|---|---|
| 2,963,853 | 12/1960 | Westcott, Jr. | 60/530 |
| 3,055,170 | 9/1962 | Westcott, Jr. | 60/530 |
| 3,183,672 | 5/1965 | Morgan | 60/516 |
| 3,434,351 | 3/1969 | Poitsas | 60/530 |
| 3,984,985 | 10/1976 | Lapeyre | 60/641.13 |
| 3,998,056 | 12/1976 | Clark | 60/641.13 |
| 4,027,480 | 6/1977 | Rhodes | 60/531 |
| 4,107,928 | 8/1978 | Kelly et al. | 60/650 |
| 4,283,915 | 8/1981 | McConnell et al. | 60/650 |
| 4,375,152 | 3/1983 | Barto | 60/530 |
| 4,441,318 | 4/1984 | Theckston | 60/527 |
| 4,452,047 | 6/1984 | Hunt et al. | 60/641.15 |
| 4,458,488 | 7/1984 | Negishi | 60/517 |
| 4,488,403 | 12/1984 | Barto | 60/530 |
| 4,509,329 | 4/1985 | Breston | 60/531 |
| 4,530,208 | 7/1985 | Sato | 60/516 |
| 4,553,394 | 11/1985 | Weinert | 60/530 |
| 4,637,211 | 1/1987 | White et al. | 60/650 |
| 4,747,271 | 5/1988 | Fischer | 60/670 |
| 5,025,627 | 6/1991 | Schneider | 60/527 |
| 5,195,321 | 3/1993 | Howard | 60/525 |

FOREIGN PATENT DOCUMENTS

| | | | |
|---|---|---|---|
| 3232497 | 2/1983 | Germany | 60/516 |
| 24709 | 3/1905 | United Kingdom | 60/530 |

*Primary Examiner*—Noah P. Kamen
*Attorney, Agent, or Firm*—Pollock, Vande Sande & Amernick

[57] ABSTRACT

A thermal hydraulic engine including a frame. A working fluid changes volume with changes in temperature. A working fluid container houses the working fluid. A cylinder secured to the frame includes an interior space. The cylinder also includes a passage for introducing the working fluid into the interior space. A piston is housed within the interior space of the cylinder. The working fluid container, the interior space of the cylinder, the piston, and the working fluid container define a closed space filled by the working fluid. The engine also includes means for transmitting heat to and removing heat from the working fluid, thereby alternately causing the working fluid to expand and contract without undergoing a phase change. The piston moves in response to the expansion and contraction of the working fluid.

23 Claims, 21 Drawing Sheets

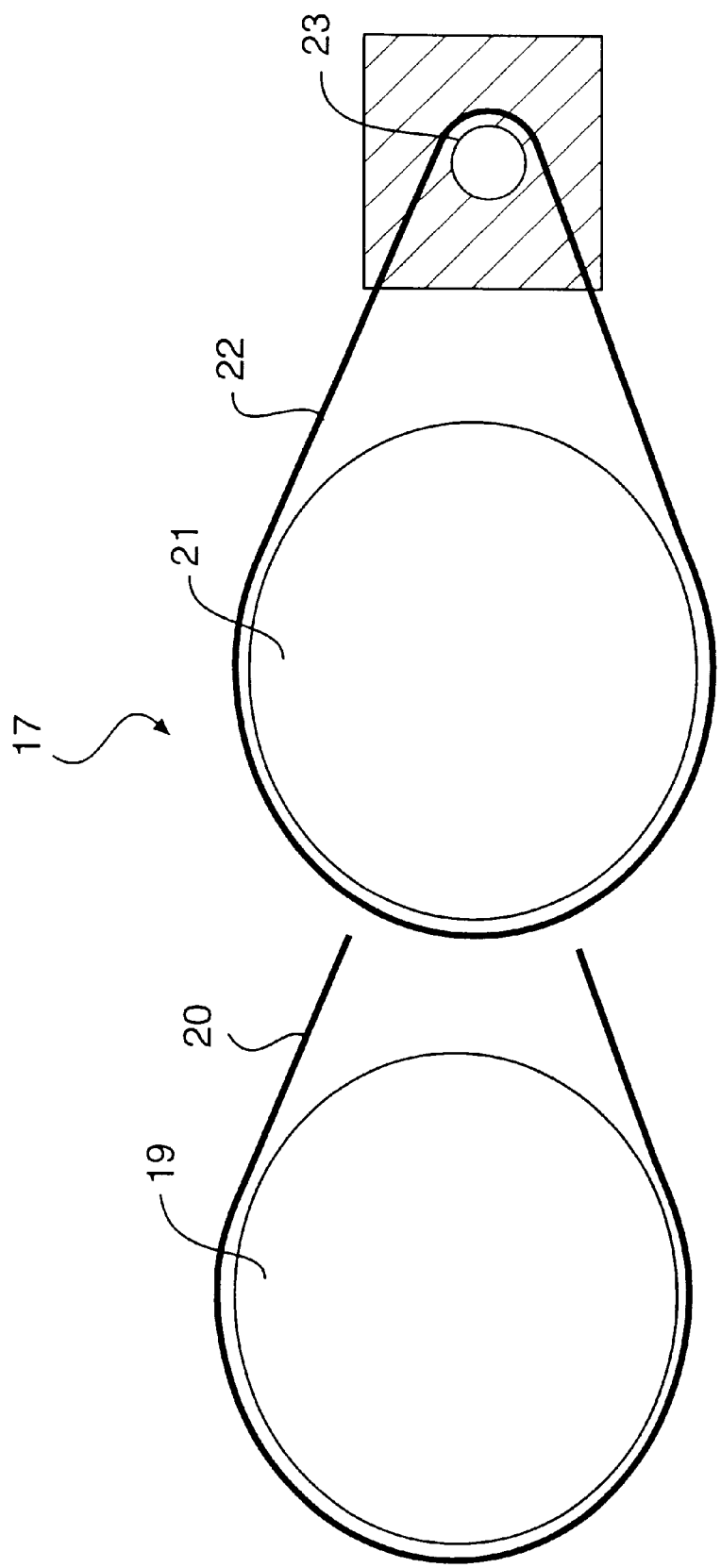

HYDRAULIC ENGINE POWERED BY INTRODUCTION AND REMOVAL OF HEAT FROM A WORKING FLUID

FIELD OF THE INVENTION

The invention relates to an engine that is powered by the expansion and contraction of a working fluid as heat is alternately applied to and removed from the working fluid.

BACKGROUND OF THE INVENTION

Typically, energy is not in readily utilizable forms. Many means exist for converting one type of energy to another. For example, an internal combustion engine can turn the explosive force of a fuel burned in its cylinders into mechanical energy that eventually turns the wheels of a vehicle to propel a vehicle. An internal combustion engine channels energy resulting from the burning of a fuel in a cylinder into a piston. Without the cylinder and piston, the energy resulting from the burning of the gas would simply spread out in every available direction. Another example of a device to convert one form of energy into another is a windmill. If connected to an electric generator, windmills can convert the mechanical action of moving air into electricity.

While an internal combustion engine typically produces mechanical energy from the burning of fossil fuels, such as gasoline, diesel fuel, or natural gas or alcohols, other attempts have been made to produce mechanical energy from the movement of members such as pistons by means other than the burning of fossils fuels. However, most of these devices still operate on the basic principle of providing a force to drive a moveable member such as a piston. The difference among the various devices in the way in which the force is produced to move the piston and the way in which the force is controlled.

Some of these devices utilize the movement of a working fluid to drive a moveable member, such as a piston. Other devices utilize the phase change in a liquid to drive a moveable member. In their operation, some devices utilize valves to control the flow of a working fluid in the production of mechanical energy by moving a moveable member.

Due to the worldwide and ever increasing demand, research constantly focuses on ways to produce energy or power the devices that we rely on in our daily lives. In recent years, another area of research has included alternative sources of energy. Such research has constantly increased. Among the reasons for the increased research is an increased awareness of the limited amount of fossil fuels in the earth. This research may also be spawned by an increased desire to provide energy for people living in remote locations around the world who now live without power.

Among the alternative sources of energy on which research has been focused is solar energy. Solar energy has been captured by photovoltaic cells that convert the sun's energy directly into electricity. Solar energy research is also focused on devices that capture the sun's heat for use in a variety of ways.

As discussed above, in relation to the internal combustion engines and windmill examples, the problem being addressed both by photovoltaic solar cells and solar heating devices is the conversion of one type of energy to another type of energy. In solar cells, the energy in sunlight is used to excite electrons in the solar cells, thereby converting the sun's energy to electrical energy. On the other hand, in solar heating cells, the energy of the sun is typically captured by a fluid, such as solar hot water panels typically seen on the rooftops of residences.

SUMMARY OF THE INVENTION

The present invention was developed with the above described problems in mind. As a result, the present invention is directed to a new device for converting one form of energy to another. The present invention may also utilize solar or other unconventional forms and/or sources of energy.

Accordingly, the present invention provides a thermal hydraulic engine that utilizes the expansion and contraction of a fluid by alternately transmitting heat to and removing heat from an operating fluid. The energy may provide mechanical and/or electrical energy.

One advantage of the present invention is that it may utilize a variety of sources of heat to heat and/or cool the working fluid.

Consequently, another advantage of the present invention is that it is substantially non-polluting.

Along these lines, an additional advantage of the present invention is that it may run off heat energy and, therefore, may be solar powered.

Furthermore, an advantage of the present invention is that, since it may be solar powered, it may be utilized to provide power in remote areas.

An additional advantage of the present invention is that it may utilize heat and/or heated water produced by existing processes. Accordingly, the present invention may make use of heat energy that is otherwise currently not utilized and discarded as waste.

A still further advantage of the present invention is that it may operate without using fossil fuels.

It follows that an advantage of the present invention is that it may produce energy without contributing to the abundance of waste gases and particles emitted into the atmosphere by the burning of fossil fuels.

Also, an advantage of the present invention is that it may include a relatively simple design that eliminates the need for a complex series of valves to control the flow of a working fluid through the system.

Accordingly, a further advantage of the present invention is that it provides a simple design, thus reducing construction and maintenance costs.

In accordance with these and other objectives and advantages, the present invention provides a thermal hydraulic engine. The engine includes a frame. The engine utilizes a working fluid that changes volume with changes in temperature. A working fluid container houses the working fluid. A cylinder is secured to the frame and includes an interior space. The cylinder also includes a passage for introducing the working fluid into the interior space. A piston is housed with the interior space of the cylinder. The working fluid container, the interior space of the cylinder, the piston, and the working fluid container define a closed space filled by the working fluid. The engine also includes means for transmitting heat to and removing heat from the working fluid, thereby alternately causing the working fluid to expand and contract without undergoing a phase change. The piston moves in response to the expansion and contraction of the working fluid.

According to additional preferred aspects, the present invention provides a thermal hydraulic engine. The engine includes a frame. The engine also includes a working fluid that changes volume with changes in temperature. A working fluid container houses the working fluid. A flexible diaphragm is provided at one end of the working fluid container. The flexible diaphragm moves in response to expansion and contraction of the working fluid without a phase change in the working fluid. A connecting rod in contact with the flexible diaphragm moves in response to movement of the flexible diaphragm. The engine also includes means for transmitting heat to and removing heat from the working fluid, thereby alternately causing the working fluid to expand and contract.

Still objects and advantages of the present invention will become readily apparent to those skilled in this art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to regarded as illustrative in nature and not as restrictive.

BRIEF DESCRIPTION OF THE DRAWINGS

FIG. 3a represents an embodiment of a chain drive gear and sprocket that may be driven by a thermal hydraulic engine according to the present invention;

FIG. 21 represents a side view of an embodiment of a thermal hydraulic engine according to the present invention that includes a frame that components of the engine are mounted on.

DETAILED DESCRIPTION OF VARIOUS AND PREFERRED EMBODIMENTS OF THE INVENTION

Figure 1:
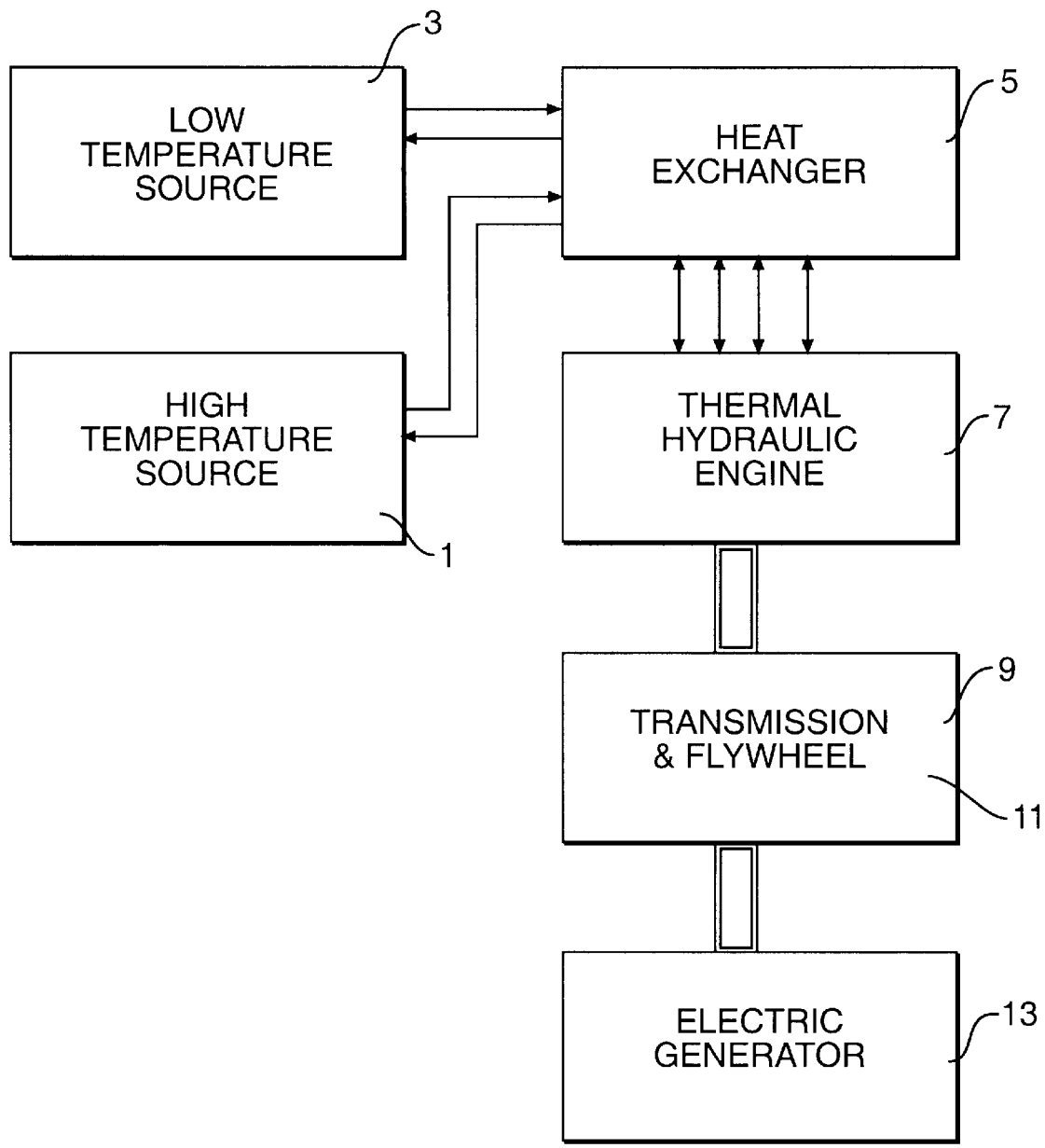
FIG. 1 represents a schematic diagram illustrating an embodiment of a power plant including a thermal hydraulic engine according to the present invention.

As stated above, the present invention is an engine that derives power from the expansion and contraction of a working fluid as heat is alternately applied to and removed from the working fluid. The expansion and contraction of the fluid is transformed into mechanical energy, via the present invention. The mechanical energy may be utilized directly. Alternatively, the mechanical engine may be turned into another form of energy, such as electricity.

Accordingly, the present invention includes a working fluid that experiences changes in volume with changes in temperature. Any such fluid may be utilized in a thermal hydraulic engine according to the present invention. However, more power may be realized from the operation of the engine if the working fluid experiences greater changes in volume over a range of temperatures than fluids that experience lesser changes in volume over the same temperature range.

The present invention operates at least in part on the principle that fluids are generally not compressible. Therefore, according to the present invention, the working fluid does not change form into another state, such as a solid or a gas during the operation of the engine. However, any fluid that undergoes an expansion or contraction with a change in temperature may be utilized according to the present invention.

Among the characteristics that may be considered in selecting a working fluid are the coefficient of expansion of the working fluid and the speed at which heat is transferred to the fluid. For example, if a fluid quickly changes temperature, the speed of the engine may be faster. However, in some cases, a fluid that quickly responds to changes in temperature may have a low coefficient of expansion. Therefore, these factors must balanced in order to achieve the desired effect for the engine. Other factors that may be considered in selecting a working fluid include any caustic effects that the fluid may have on the working fluid container, the environment, and/or people working with the engine.

An example of a working fluid that may be utilized according to the present invention is water. Another fluid that may be utilized is mercury. Additionally, other substances that may be utilized as a working fluid include FREON, synthetic FREONS, FREON R12, FREON R23, and liquified gasses, such as liquid argon, liquid nitrogen, liquid oxygen, for example. FREON and related substances, such as synthetic FREONS, FREON R12, and FREON R23, may be particularly useful as a working fluid due to the large degree of expansion that they may undergo as heat is introduced into them and the tendency to return to their original volume and temperature upon removal of heat.

In order to capture the energy in the expansion of the fluid, the working fluid is housed within a closed space. The closed space may include many different elements. However, the closed space typically includes at least a working fluid container.

Preferably, the working fluid entirely fills or substantially entirely fills the interior of the working fluid container when the working fluid is in a non-expanded or substantially non-expanded state. In other words, typically, the working fluid is placed in the working fluid container at its densest state, wherein it occupies the least amount of volume. The working fluid container may then be sealed or connected to other components of the engine.

The volume of the working fluid container depends upon, among other factors, the size of the engine, the application, the amount of working fluid required for the application, the amount that the working fluid expands and contracts with changes in temperature. The exact interior volume of the working fluid container will be discussed below in relation to specific embodiments. However, such embodiments are only illustrative in nature and not exhaustive and, therefore, only represent examples of working fluid containers.

Preferably, the working fluid container is made of a material that can withstand the pressure from the working fluid as the working fluid expands. Materials that may be utilized to form the working fluid container include metals, such as copper, plastics, ceramics, carbon steel, stainless steel or any other suitable materials that may withstand the temperatures and pressures involved in the specific application. Regardless of the material used, preferably, it is non-deformable or substantially so when subjected to the forces generated by the expansion of the fluid. The material may change due to the effect of heat but preferably not due to the force from the expanding fluid. The non-deformability of the material that working fluid container is made is helpful for transmitting the force of the expansion of the working fluid to whatever moveable member, such as a piston, the particular embodiment of the present invention includes.

Another stress that the working fluid container is subjected to results from the heating and cooling of the working fluid. As the temperature of the working fluid increases, the working fluid container may expand, due to the application of heat. Similarly, as the working fluid cools, the materials in contact with the fluid will cool and may contract.

Therefore, regardless of the material used, not only should it be capable of withstanding temperatures and pressures of a particular application, but it must also be able to withstand the changes in temperatures and pressures that continuously occur during the operation of a thermal hydraulic engine according to the present invention. For instance, metal fatigue could be a problem in embodiments in which are made of metal. However, metal fatigue may be overcome by those skilled in the art who can adapt the particular metal to the particular conditions involved in a particular embodiment.

Accordingly, it is preferable that the materials in contact with the working fluid, such as the working fluid container, also have some elastic characteristics. A material that is excessively brittle might tend to crack and leak, rendering the engine inoperable.

The number of working fluid containers included an embodiment of the present invention typically depends upon the number of cylinders or other devices utilized for capturing the energy of the expansion of the working fluid. Preferably, the number of working fluid containers is equal to the number of expansion capturing devices. However, it conceivable that there could be more or less working fluid containers.

For example, one embodiment of the present invention includes a piston that is moved back and forth within a cylinder in both directions by the expansion of the working fluid. Such an embodiment may include two working fluid containers for each cylinder. Therefore, as can be appreciated, the number of working fluid containers in the embodiment of the invention may vary.

The working fluid container may be interconnected with a cylinder. Alternatively, the working fluid container may be isolated in a fluid containment system. According to such a system, the force generated by the expansion of the working fluid is not transmitted directly to a piston or other movable member, but is indirectly transmitted.

If the working fluid container and cylinder are connected so that the force of the expansion of the working fluid is directly transmitted to a piston or other movable member, the working fluid container and cylinder may be interconnected in a variety of ways. For example, a tube, hose or other conduit may be utilized to connect the working fluid container with the cylinder. Alternatively, the working fluid container may be directly connected to the cylinder. Preferably, if the cylinder is connected to the working fluid container with a hose or other conduit, the hose or conduit is also made of a material the resists changes in shape as a result of the forces applied by the expansion of the working fluid. An example of such a material includes steel reinforced rubber hose.

As stated above, the working fluid may be isolated in the working fluid container. According to such embodiments, rather than being directly transmitted to the piston, the force of the expanding fluid may be transmitted to a hydraulic fluid, which then transmits the force to the piston.

According to such embodiments, the working fluid is housed within the working fluid container. The working fluid container is in contact with the heat exchanger. However, rather than the working fluid traveling from the working fluid container into a cylinder to actuate a piston as the fluid expands, the end of the working fluid container that is not surrounded by the heat exchanger is closed a flexible blind flange.

Figure 12:
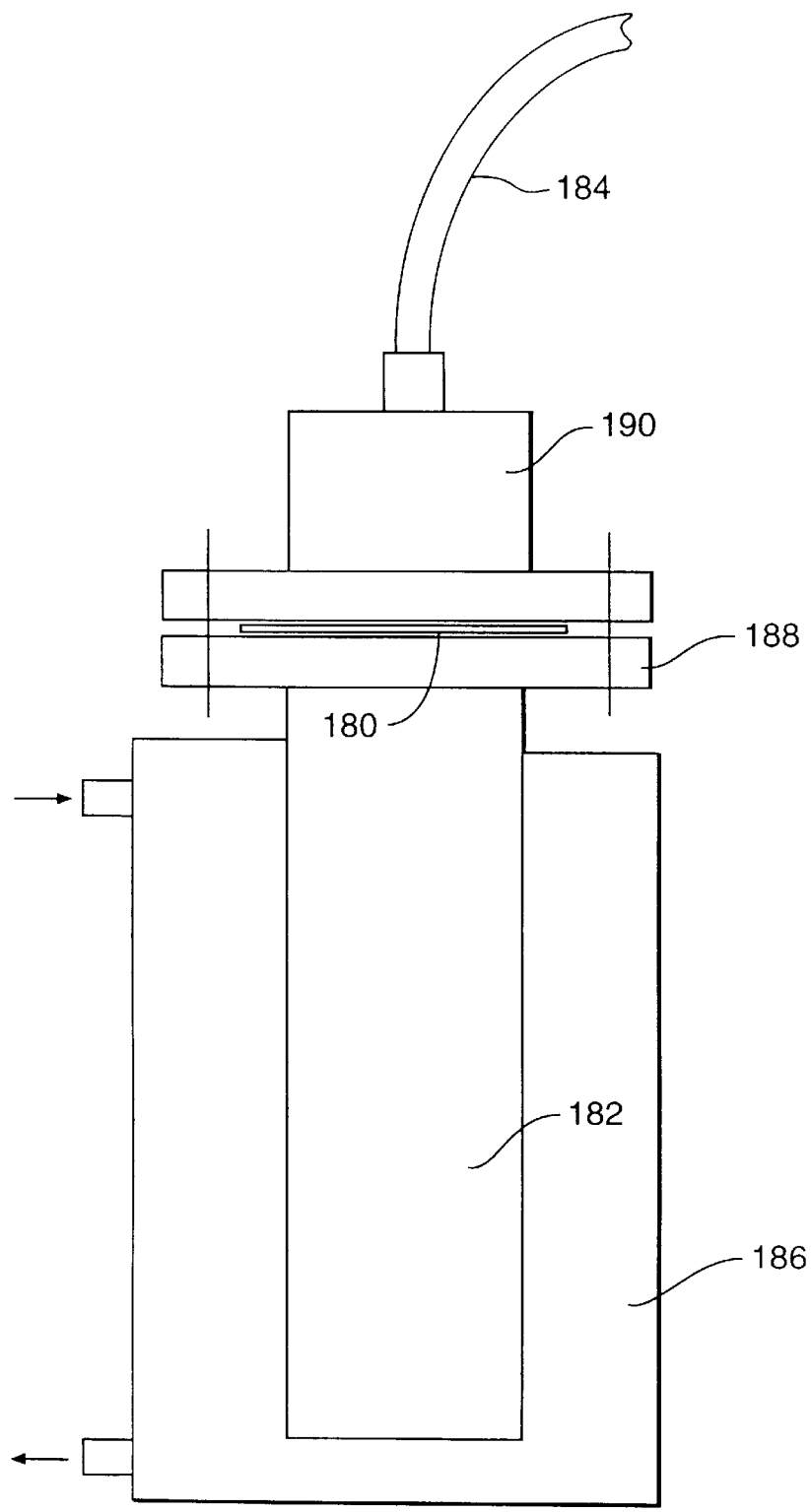
FIG. 12 represents a cross-sectional view of an embodiment of a heat exchanger and working fluid container for use with a thermal hydraulic engine according to the present invention that employs mercury as a working fluid.

In the embodiment shown in FIG. 12, the working fluid container and the hydraulic system may be thought as defining two sections making up an overall fluid containment system. The flexible blind flange 180 may be thought of as isolating the working fluid. Therefore, the working fluid container 182 in such embodiments may be referred to as a fluid isolation section. Another part of the fluid containment system is the hydraulic system 184. The hydraulic system may be thought of as a transfer section that transfers the force of the working fluid to the piston.

A fluid containment system is particularly useful if the working fluid is a caustic or hazardous material, such as mercury. Not only does the containment and transfer section permit a hazardous working fluid to be used with the engine, but it also permits the sections of the engine to be manufactured and shipped separately and be maintained separately. For example, the working fluid container, with or without the heat exchanger 186, could be shipped separately from the heat exchanger and cylinder to which it is be interconnected with.

The fluid containment system includes the flexible blind flange as well as the hydraulic reservoir and other hoses, fittings, tubing, and passageways that may be necessary to permit the hydraulic fluid to operate the piston. As discussed above, the flexible blind flange permits the force of the expanding wording fluid to be transmitted to the hydraulic fluid. Regardless of the components and materials utilized in constructing the fluid containment system, preferably it maintains the temperature and pressure of the working fluid.

According to one such embodiment, a mounting flange 188 extends about the opening of the working fluid container 182. Preferably, the flexible blind flange 180 is then positioned on the mounting flange 188 connected to the working fluid container 182. The hydraulic fluid reservoir may then be attached over the flexible blind flange. Preferably, the hydraulic fluid reservoir preferably includes a mounting flange 190 having a shape corresponding to the shape of the mounting flange 188 on the working fluid container 182. The hydraulic fluid reservoir and the working fluid container may then be tightly connected together in order to seal the space between them, thereby preventing the working fluid from escaping the working fluid container.

The hydraulic fluid reservoir is connected directly or through one or more conduits to the cylinder. The hydraulic fluid then acts as the working fluid other wise would if it were not isolated in the working fluid container. According to such an embodiment, as the working fluid expands, it applies pressure to the flexible blind flange. The flexible blind flange then applies force to the hydraulic fluid. A pressure is then created on the hydraulic fluid. The pressure applied to the hydraulic fluid, causes it to place pressure on all surface of the reservoir, cylinder, and piston. Since the piston is the only movable member in the system, it moves in response to the pressure.

Figure 13:
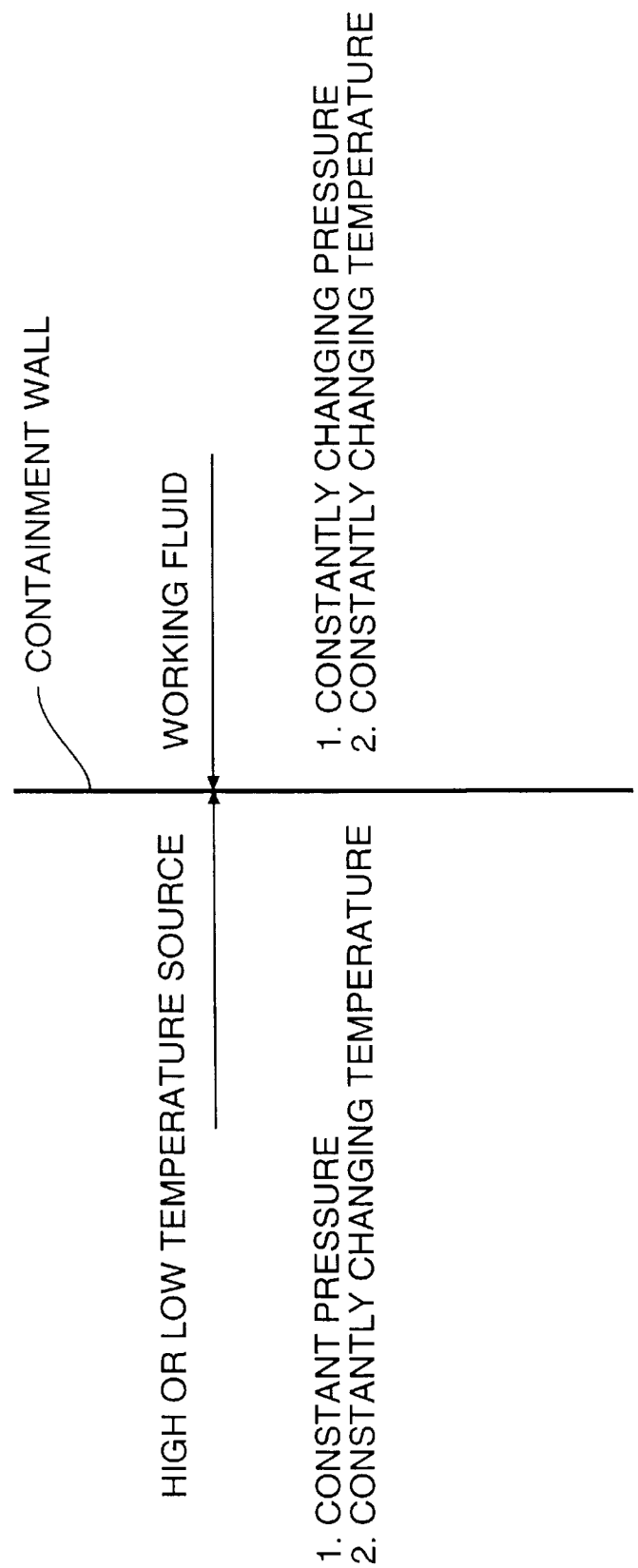
FIG. 13 represents an embodiment of a containment wall for use with an embodiment of a working fluid container according to an embodiment of the present invention.

FIG. 13 shows the containment wall between the interior of the working fluid container and the interior of the heat exchanger.

The number of working fluid containers and possibly containment sections may vary, depending upon, among other factors, the number of cylinders and whether a power return stroke, as described below, is utilized.

As discussed above, the working fluid expands and, either directly or indirectly, the expanding fluid is directed to a cylinder. The cylinder is at the heart of the invention since the cylinder houses the piston that the force of the expanding working fluid is transmitted to, thereby moving the cylinder and initiating the mechanical energy produced by the invention.

As with the working fluid container and other components of the invention, the cylinder may be made of a variety of materials. The above discussion regarding stresses on the working fluid container and the material that it is made of applies to the cylinder. Accordingly, the same materials may be utilized to form the cylinder.

The size of the cylinder may vary, depending upon a number of factors related to the specific application. Factors that may be important is determining the size of the cylinder include, among others, the number of cylinders, the particular load on the engine, and the amount of power to be produced. A typical size of the maximum interior volume of a cylinder included in a thermal hydraulic engine according to the present invention is from about 350 cubic inches to about 20,000 cubic inches. However, the size of each of the cylinders may vary from about 4 inches in diameter to about 36 inches in diameter.

According to one embodiment, an engine with a cylinder having a diameter of about 5 inches and a piston stroke of about 18 inches generates about 10 horsepower.

Preferably, the cylinder has a circular or substantially circular cross sectional shape.

Figure 5:
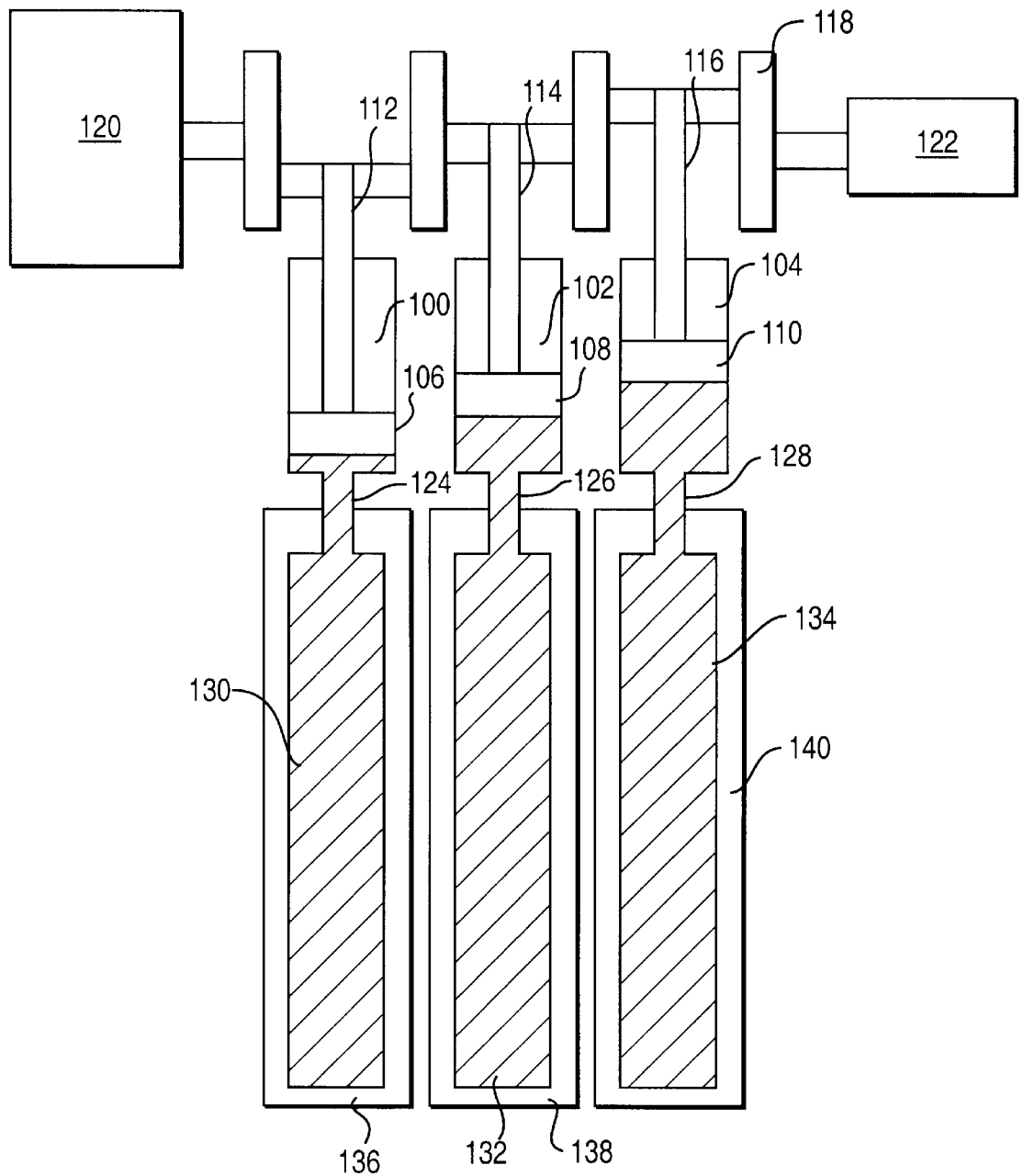
FIG. 5 represents an embodiment of a thermal hydraulic engine according to the present invention including three cylinders.
Figure 6A:
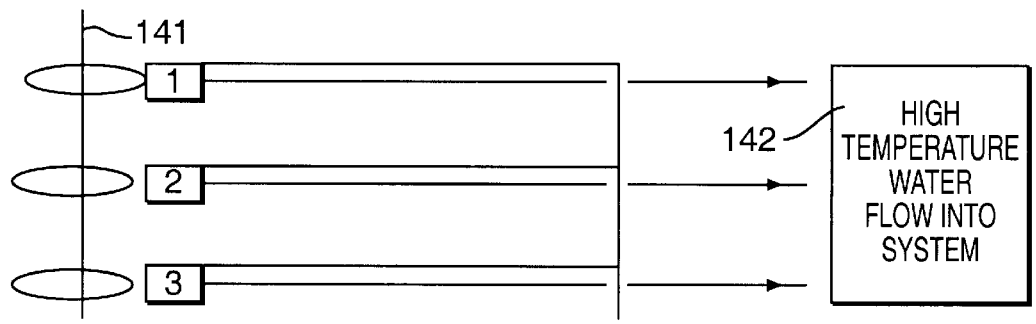
FIGS. 6A–6D represent the various stages of the operation of an embodiment of a thermal hydraulic engine according to the present invention that includes three cylinders.
Figure 6B:
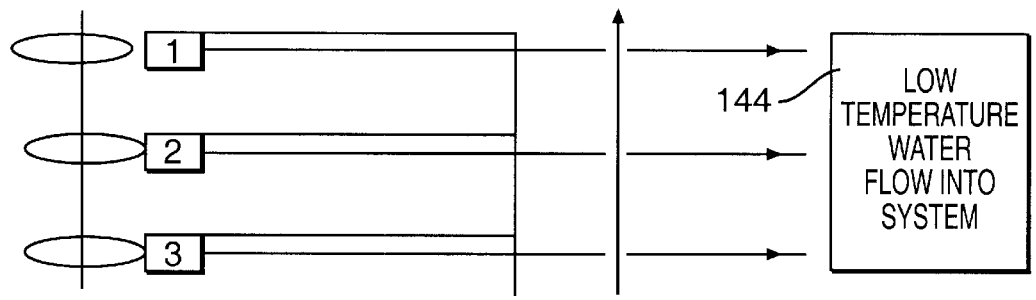
Figure 6C:
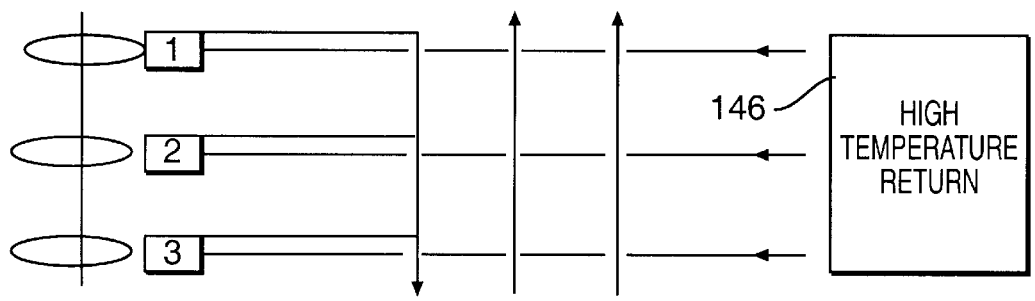
Figure 6D:
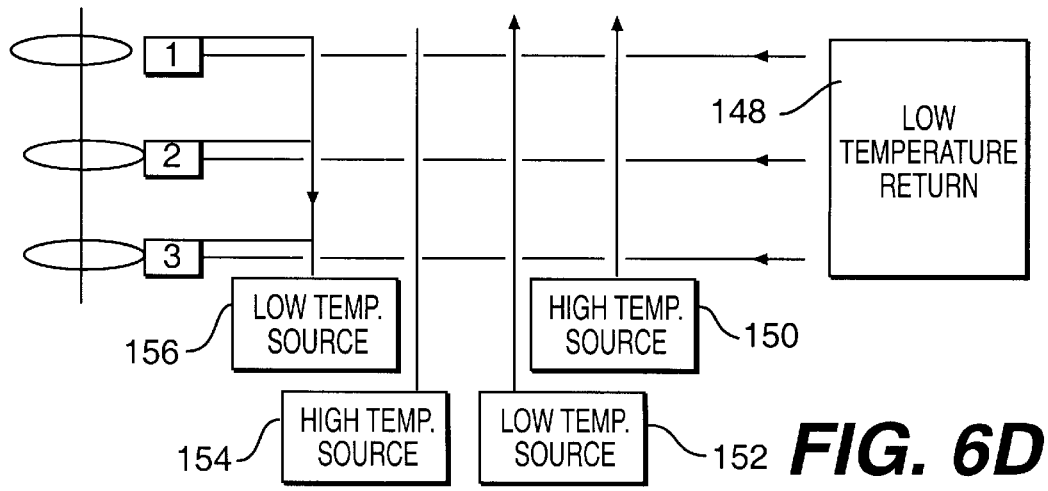
Figure 7:
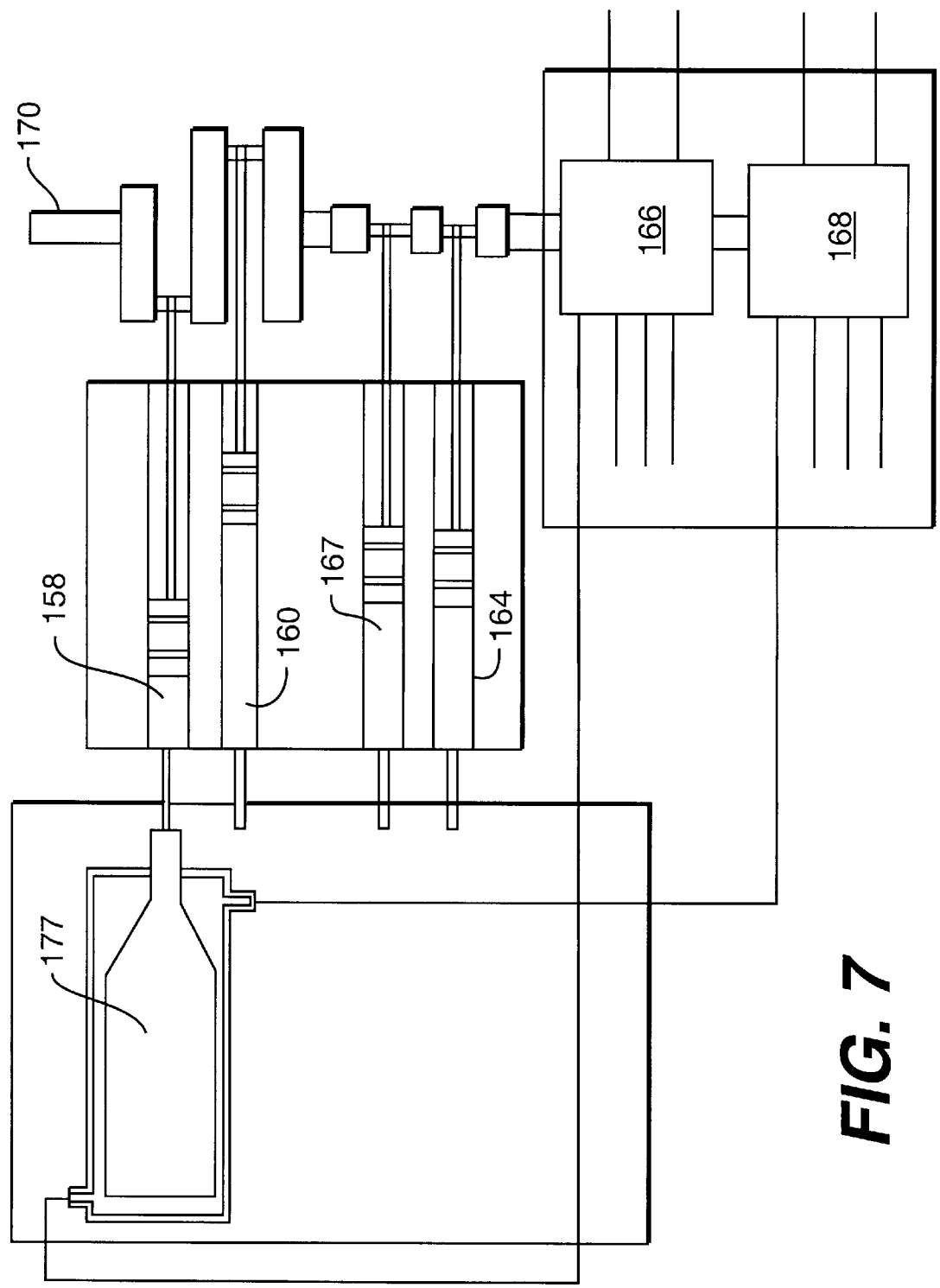
FIG. 7 represents an embodiment and operation of a thermal hydraulic engine according to the present invention that includes four cylinders.
Figure 14:
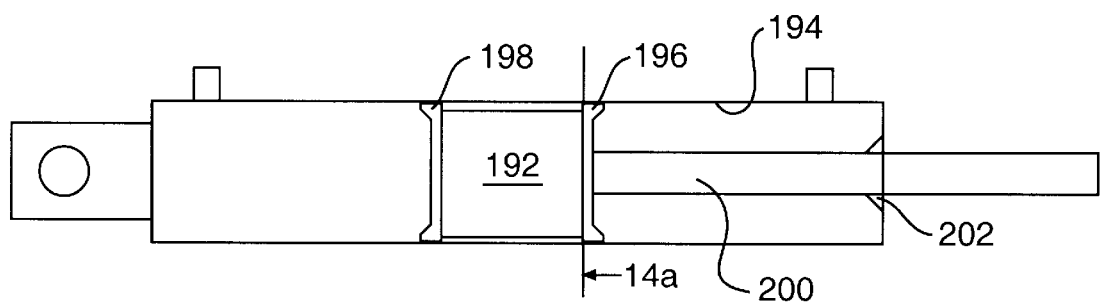
FIG. 14 represents a cross-sectional view of another embodiment of a cylinder and piston that may be employed in a thermal hydraulic engine according to the present invention.
Figure 14B:
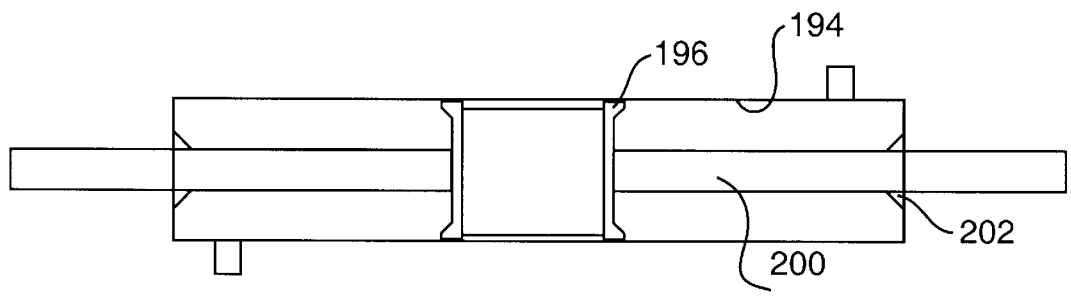
FIG. 14b represents a cross-sectional view of an embodiment of a cylinder and piston, wherein the piston includes a connecting rod attached to both ends.

FIGS. 5, 7, and 14 illustrate examples of various embodiments of cylinders that may be utilized in a thermal hydraulic engine according to the present invention.

Figure 17:
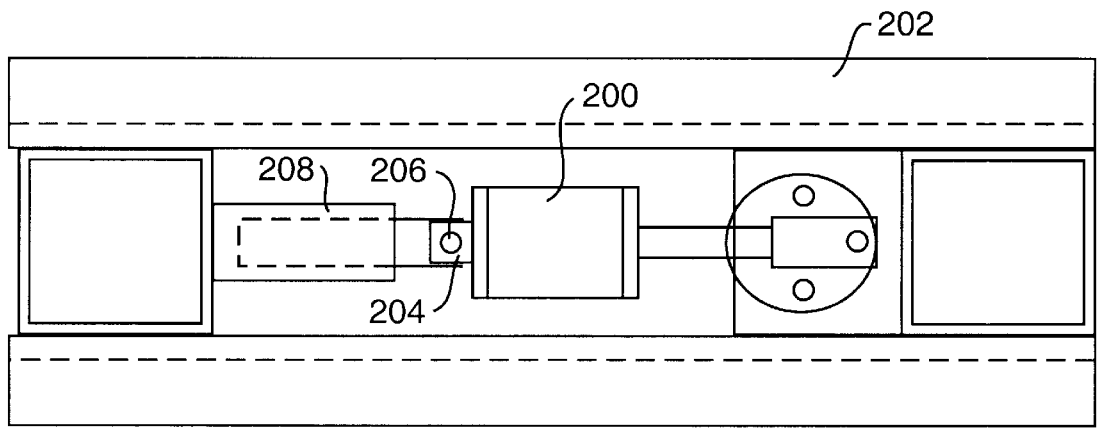
FIG. 17 represents a side view of an embodiment of a thermal hydraulic engine according to the present invention that includes a cylinder mounted to a crankshaft and pivotably mounted to a floating anchor sliding within a guide mounted to a frame.
Figure 18:
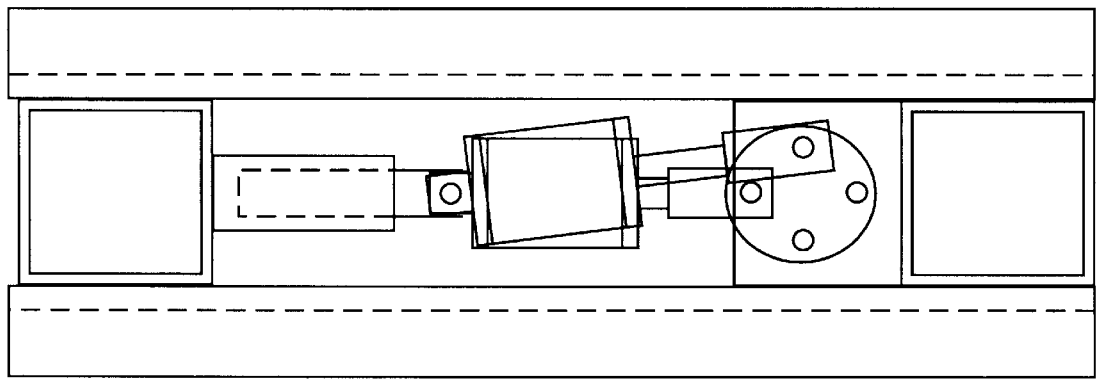
FIG. 18 represents the embodiment shown in FIG. 17, wherein the piston is starting its power stroke and the crankshaft has started to rotate.
Figure 19:
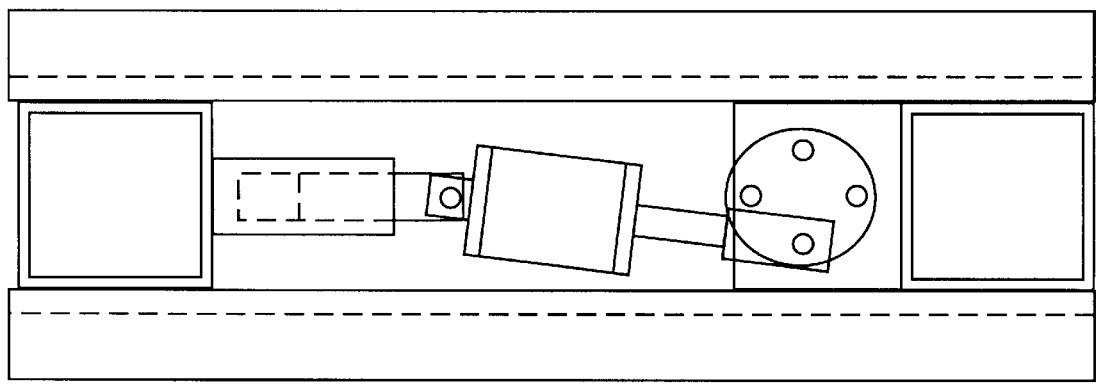
FIG. 19 represents the embodiment shown in FIGS. 17 and 18, wherein the piston has started its return stroke and the floating anchor is sliding back into its guide.

The cylinder may be mounted to a frame upon which other components of the present invention may be mounted. The cylinder may be fixably or articulately mounted to the frame. FIGS. 17, 18, and 19 show an embodiment of the present invention in which the cylinder 200 is articulately or pivotably mounted to a frame 202. According to this embodiment, the cylinder 200 includes a connecting member 204, such as a fork or other suitable member, that may be pivotably joined to a complementary member on the frame 202. A pin 206 is one means for connecting the cylinder to the frame that may be utilized. As the piston moves through its cycle, and the crankshaft rotates, the cylinder will pivot about its anchor.

The embodiment shown in FIGS. 17–19 also includes a floating anchor. According to this embodiment, the cylinder is pivotably mounted to the anchor to that the cylinder can pivot. The anchor is movably mounted within a guide 208. The guide 208 permits the anchor to slide from right to left as shown in FIGS. 17–19. The guide 208 may be directly or indirectly connected to the frame 202.

The floating anchor permits the piston to contract without having to wait for the crankshaft to continue its rotation and without having to overcome any other forces tending acting on the piston in a direction opposite to its return stroke.

Regardless of the embodiment of the present invention, it may include a floating anchor.

Figure 20:
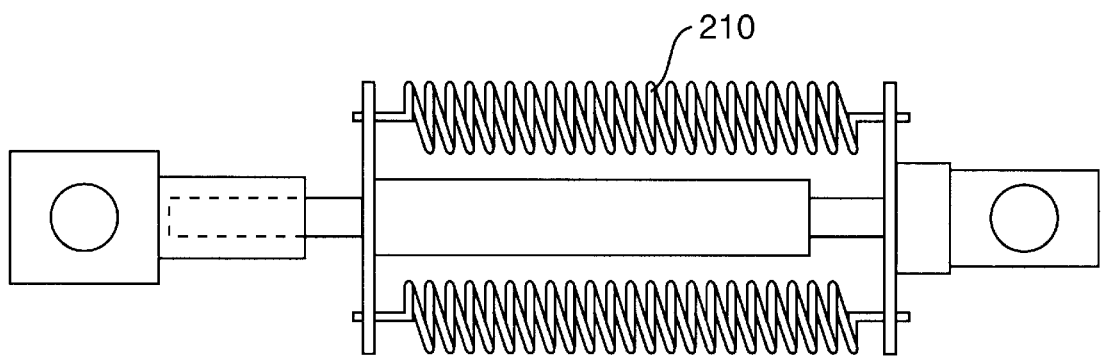
FIG. 20 represents a side view of an embodiment of a thermal hydraulic engine according to the present invention that includes two springs for biasing the piston in the direction of its return stroke and a floating anchor shown in FIGS. 17–19.

FIG. 20 shows an embodiment of a thermal hydraulic engine according to the present invention that includes springs 210 that bias or tend to move the piston in the direction of its return stroke. If the engine includes springs, it may include at least one spring. Use of springs to cause the cylinder to move in the direction of its return stroke may be important to maintain a pressure on the working fluid at all times. With some working fluids, this is particularly important, such as with FREON, FREON substitutes and analogous compounds.

According to the embodiments shown in FIGS. 5, 6, and 7, the working fluid is introduced into one end of the cylinder. Therefore, cylinders according to these embodiments include a connection only at this end. However, according to other embodiments, discussed below in greater detail, the return stroke, as well as the power stroke, is powered by a working fluid. According to such embodiments, the cylinder may include means for introducing a working fluid into both ends of the cylinder. Such embodiments may also include a seal about a connecting rod attached to the piston, as described below in greater detail.

A displacable member piston may be located within the cylinder. One example of such a displacable member is a piston. The displacable member will slide back and forth along the length of the cylinder in response to changes in the volume of the fluid with changes in temperature.

In order to maintain the working fluid in a closed space, preferably, the working fluid is prevented from passing between the cylinder and the piston. This may be accomplished by providing a piston having a cross-sectional area only very slightly less than the cross-sectional area. Also, helping to ensure a seal between the piston and the cylinder is if the piston has substantially the same cross sectional shape as the cross sectional shape of the interior of the cylinder.

Any space between the piston and the cylinder may be further sealed by providing a seal about the piston. Alternatively, a seal may be located on the surface of the piston facing the interior of the cylinder about the edge of the piston. The seal helps to ensure that the space between the piston and cylinder is sealed. Sealing the space helps to ensure that any energy that may be derived from the expansion of fluid will be transferred to the piston and not be wasted by fluid leaking between the piston and the cylinder. If fluid were to leak, it could greatly degrade the performance of the engine.

Figure 14A:
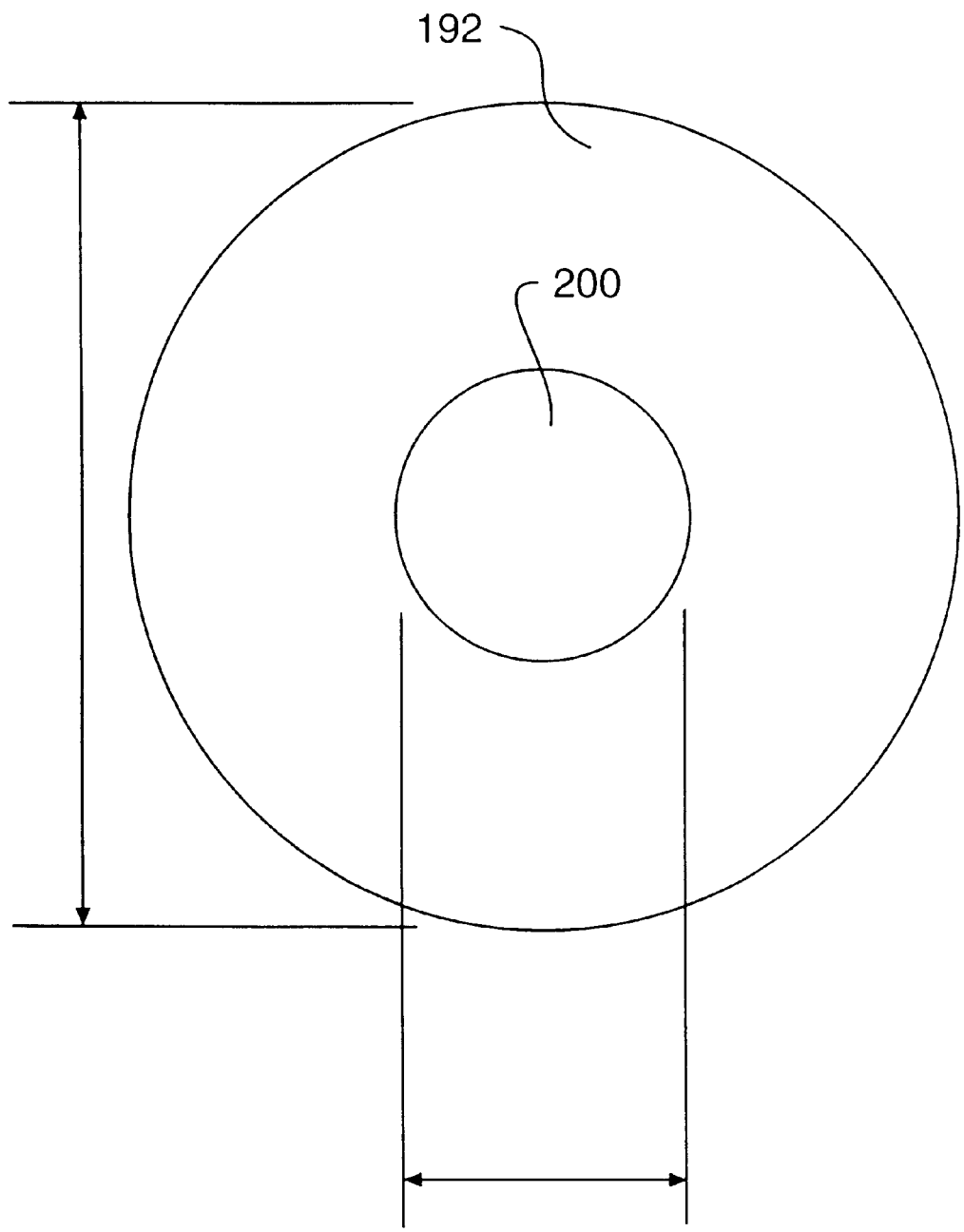
FIG. 14a represents a cross-sectional view of the embodiment of a piston and connecting rod shown in FIG. 14.
Figure 15:
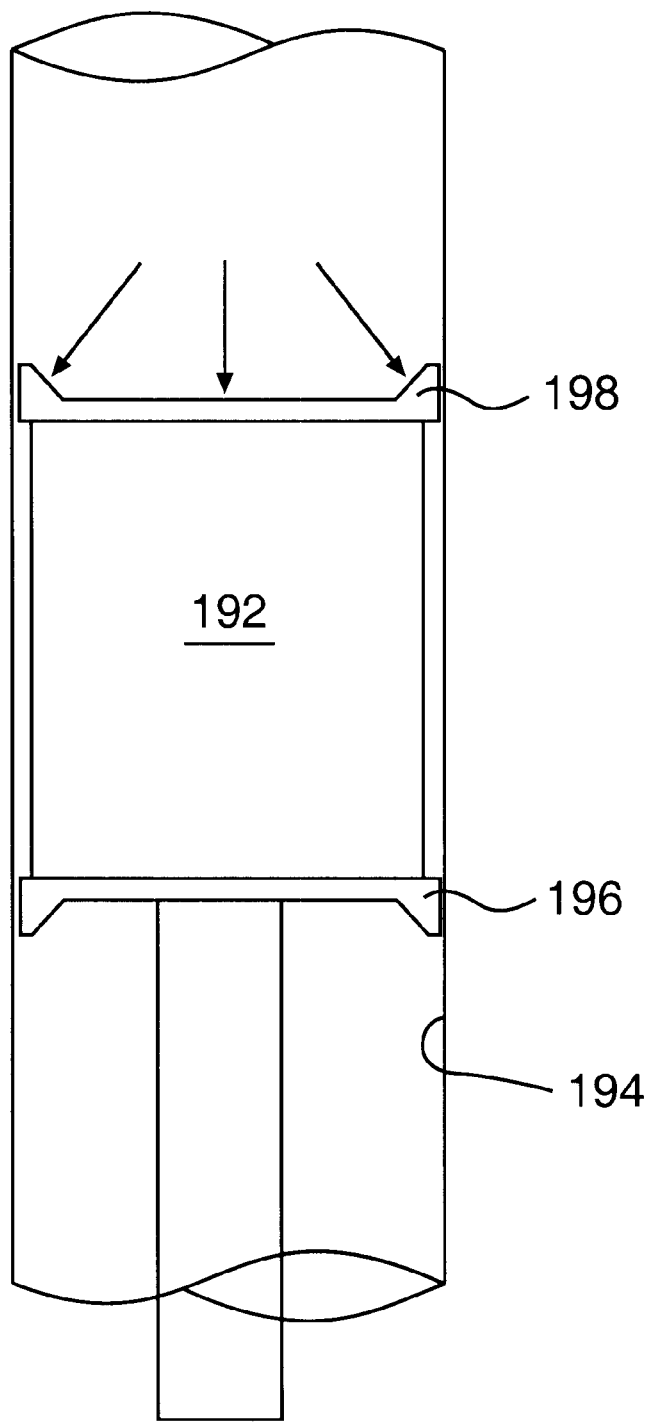
FIG. 15 represents a close-up cross-sectional view of a portion of the embodiment of a cylinder and piston shown in FIG. 14.

FIGS. 14, 14a, and 15 show an alternative embodiment of a piston and cylinder arrangement that may be utilized in an engine according to the present invention. According to this invention, the working fluid is introduced into the cylinder on both sides of the piston 192. Accordingly, the area where the piston and the cylinder wall 194 meet is sealed by seals 196 and 198 on both sides of the piston 192.

In order to transmit the force from the piston to a crankshaft or other transmission member, a connecting rod may be attached to the piston. In embodiments without a powered return stroke, the connecting rod may be connected to the side of the piston opposite the side facing the working fluid, or hydraulic fluid in embodiments including a working fluid containment system. In embodiments including a powered return stroke, the connecting rod is still connected to the piston. However, both sides of the piston are in contact with the working fluid.

In embodiments that include the powered return stroke, the end of the cylinder that the connecting rod 200 projects from must be sealed by seal 202 to maintain the pressure of the working fluid for the powered return stroke.

As shown in FIG. 14a, the force of the working fluid on the side of the piston that is attached to the connecting rod 200 will only be transmitted to that portion of the piston 192 surrounding the connecting rod. This causes a reduced effective force being delivered to the crank shaft. This reduction in service area of the piston may be compensated for by increasing the capacity and speed with which heat is transferred to the working fluid.

Figure 16:
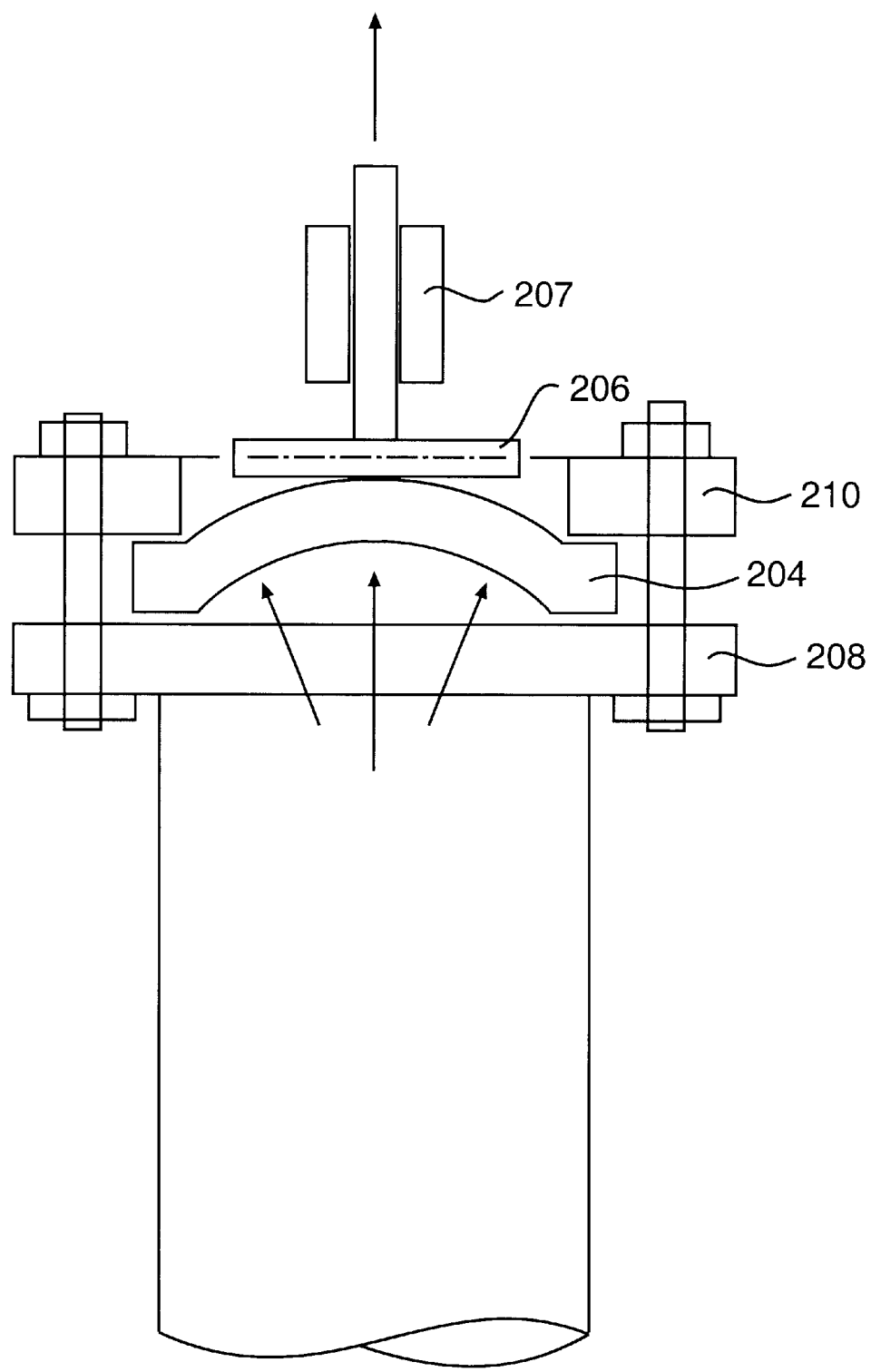
FIG. 16 represents a cross-sectional view of an embodiment of an end of a cylinder of an embodiment of a thermal hydraulic engine according to the present invention that includes a flexible flange for transmitting the force generated by an expansion of the working fluid to a hydraulic fluid and, ultimately, to a piston.

FIG. 16 shows an alternative embodiment of a thermal hydraulic engine that includes a flexible blind flange. According to this embodiment, the force generated, indicated by arrows in FIG. 16, by the expanding working fluid applies force to the flexible blind flange 204. The flange then acts upon member 206, thereby displacing member 206. Movement of member 206 may be guided by guide 207. Member 206 is interconnected with a crankshaft or other drive mechanism (not shown in FIG. 16). The flange 204 may be secured between two mounting flanges 208 and 210 similarly to the embodiment shown in FIG. 12.

Regardless of whether the engine includes a powered return stroke, the connecting rod may be fixably or movably attached to the piston. If the connecting rod is fixably attached to the piston, then the cylinder preferably is articulately mounted to the frame. Regardless of whether the connecting rod is movably or fixably attached to the piston, the connecting rod may include one or more sections.

The connecting rod may be connected to a crank shaft and other transmission elements to drive a device or an electric generator. In some embodiments, the cylinder is fixedly attached to a frame and the connecting rod articulately attached to the piston and a crank shaft so that as the piston moves back and forth through its stroke and the crank shaft rotates, the connecting rod will change its position.

The transmission elements are then connected to a load to perform a desired function. For example, the engine could power a water pump, an electric generator, and/or a FREON compressor, among other elements.

In order to transmit heat to and remove heat from the working fluid, the working fluid container preferably is in communication with means for transmitting heat to and removing heat from the working fluid contained in the working fluid container. The same means may perform both heating and cooling. Alternatively, the present invention could include separate means for performing each function.

According to one embodiment, the means for transmitting heat to and removing heat from the working fluid is a heat exchanger. Depending upon whether it is desired that the working fluid be heated or cooled, relatively warmer or relatively cooler water or other material may be introduced into the heat exchanger. Preferably, a thermal hydraulic engine according to the present invention includes one heat exchanger for each working fluid container, although an engine according to the present invention could include any number of heat exchangers.

Figure 11:
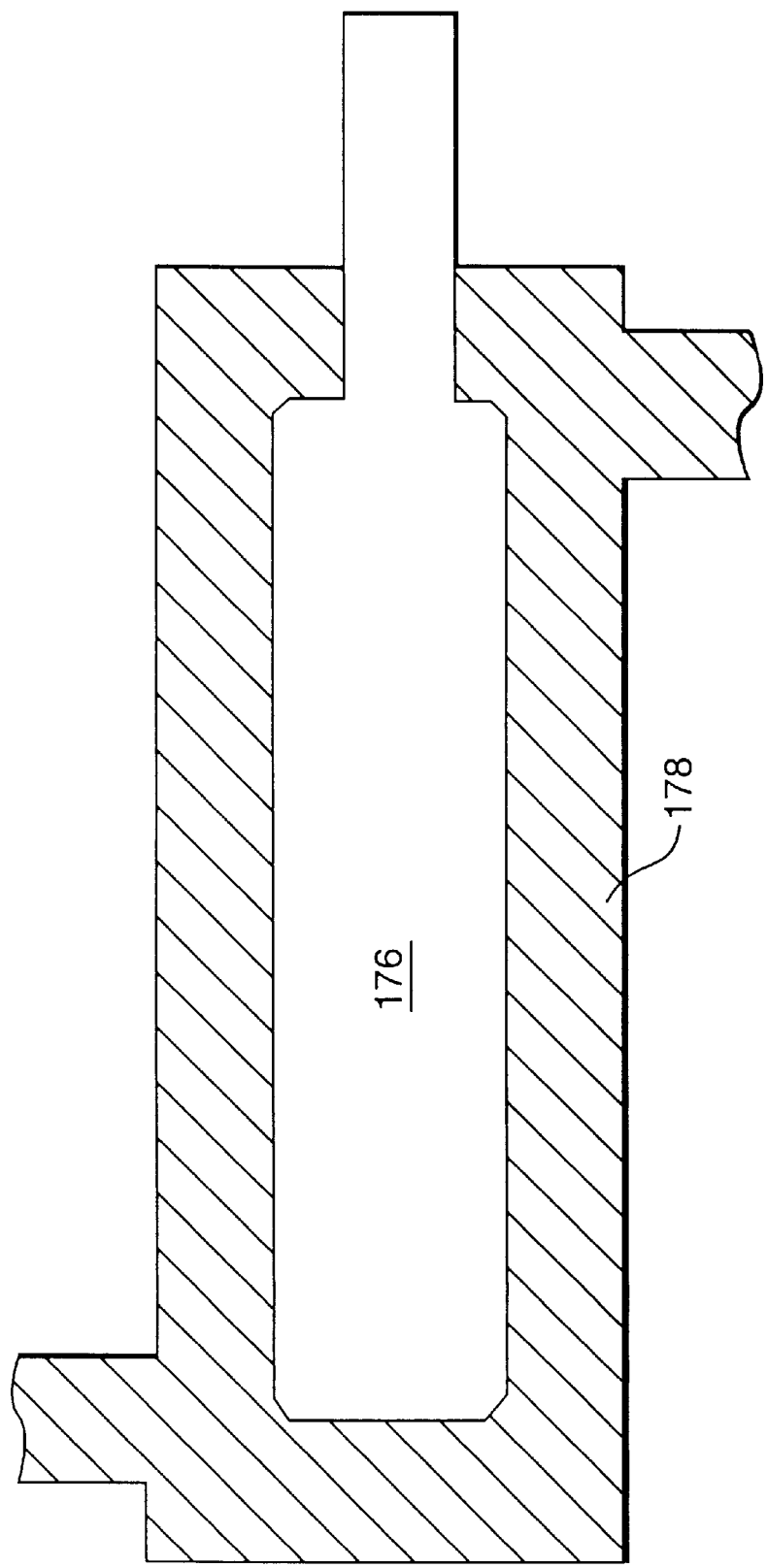
FIG. 11 represents a cross-sectional view of an embodiment of a heat exchanger for use with a thermal hydraulic engine according to the present invention.

FIG. 11 shows an embodiment of heat exchanger or working fluid container according to the present invention. According to this embodiment, the working fluid container 176 is surrounded by the heat exchanger 178.

This heat exchanger includes two openings, an inlet and an outlet. A relatively hotter or cooler material may be introduced into the heat exchanger to heat or cool the working fluid. Whether the working fluid is heated or cooled depends at least in part upon whether the material in the heat exchanger is relatively hotter or cooler than the working fluid. The working fluid container may include a plurality of fins or other devices to increase the surface area of the working fluid container in contact with the material introduced into the heat exchanger.

Among other alternatives for increasing heat transfer to the working fluid is including a circulation pump in the working fluid container. A circulation pump can create turbulent flow for increased heat transfer speed.

The heat exchanger is one example of a means for transmitting heat to or removing heat from the working fluid. The heat exchanger can be built around the working fluid container whether part of a containment system or not. In a heat exchanger, typically, high and low temperature fluids are brought into contact with the working fluid container. Typically, the fluid circulating through the heat exchanger is under relatively low pressure. However, the working fluid changes temperature, depending upon whether it is desired to heat or cool the working fluid. Therefore, the heat exchanger preferably is also constructed of a material capable of withstanding the pressures and temperatures that the fluid circulating through it is at. Examples of materials that may be utilized in the heat exchanger are polyvinylchloride (PVC) pipe, metal pipe such as carbon steel, copper, or aluminum, cast or injected molded plastic, or a combination of any materials capable of withstanding the pressures and temperatures involved in the heat exchanger.

It is not necessary that only a liquid be utilized in the heat exchanger to transmit heat to or remove heat from the working fluid. For example, gases or a combination of liquid and gases may also be used in the heat exchanger to heat and/or cool the working fluid.

One advantage of the present invention is that any high and low temperature source material, whether liquids, or gases or transmitted by another means may be used to heat and cool the working fluid. For example, heated waste water from industrial processes could be used to transmit heat to the working fluid. Such water typically is cooled in some manner before being discharged to the environment. Therefore, rather than being wasted, the heat in this water could be utilized in the present invention to produce mechanical and/or electrical energy. As stated above, solar heating and cooling could also be used according to the present invention. It is this ability to utilize heat and cooling from unutilized sources, such as waste heat, or free sources, such as the sun, that makes the present invention so desirable.

If a fluid is used in the heat exchanger, preferably, the liquid and/or gas should be under at least some amount of pressure to ensure that the liquids and/or gases flow through the heat exchanger. As the heated liquid and/or gas moves through the heat exchanger, it will transfer its greater heat energy to the working fluid having a lower heat energy. The working fluid will then expand, applying force against a piston, flexible barrier or other member, thereby producing mechanical energy.

When the working fluid has absorbed as much heat as is possible or as is desired from the heat exchanger, a relatively cooler liquid and/or gas may be transferred through the heat exchanger. The heat in the working fluid will then, according to natural laws, flow to the relatively cooler liquid and/or gas in the heat exchanger.

Figure 22:
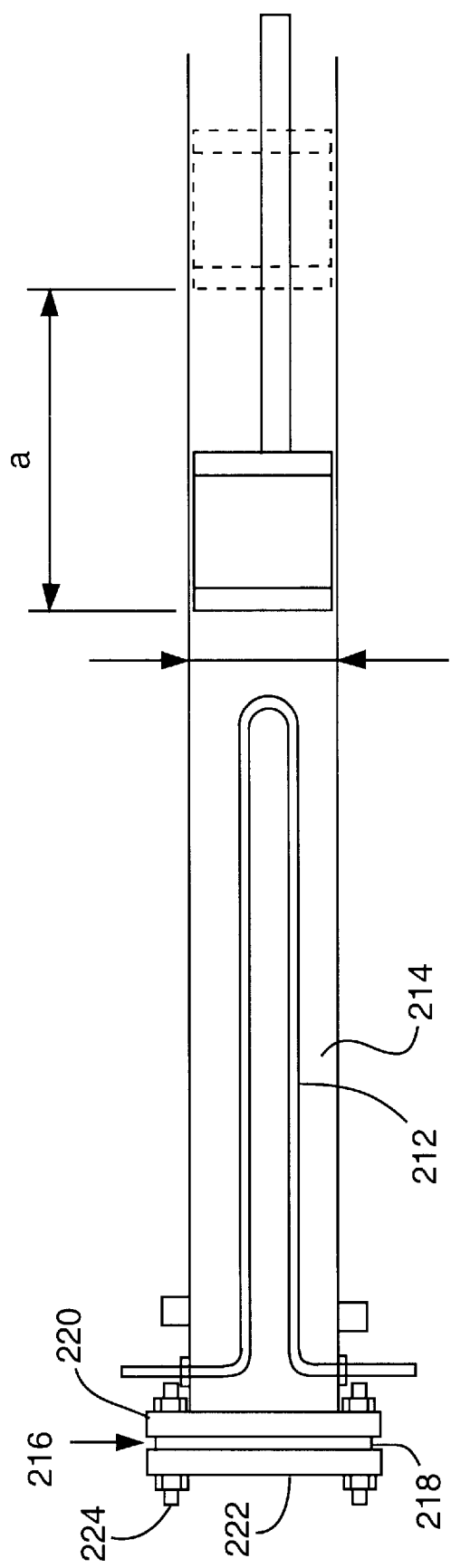
FIG. 22 represents a cross-sectional view of an embodiment of a cylinder of a thermal hydraulic engine according to the present invention in which a heat exchanger is mounted within the working fluid container.

FIG. 22 shows an alternative embodiment of a heat exchanger according to the present invention. According to this embodiment, the heat exchanger 212 is located within the working fluid container 214. According to this embodiment, the working fluid container is also continuous with the piston. According to other embodiments that include the heat exchanger within the working fluid container, the working fluid container may not be continuous with the cylinder. In FIG. 22, distance a represents the travel of the piston between its maximum positions at the power and return strokes. The end 216 of the working fluid container 214 may be sealed with a flange 218 secured between a flange 220 on the working fluid container and an end flange 22 secured to the working fluid container flange 220 with bolts 224.

FIG. 5 shows a simple version of a three cylinder engine according to the present invention. The components shown in FIG. 5 may not necessarily be in the same physical position in relation to each other in the engine and are shown here in this arrangement for ease of understanding. The engine may also include other components not necessary include in these embodiments or shown in this Figure.

The engine shown in FIG. 5 includes three cylinders 100, 102 and 104. A piston 106, 108, and 110, respectively, is disposed within each of the cylinders. Each of the pistons is connected to a connecting rod, 112, 114, and 116, respectively, that is connected to a crank shaft 118.

The number of cylinders and pistons included in the invention may vary, depending upon the embodiment and factors described above. An engine utilizing a piston such as that shown in FIGS. 14 and 15 may utilize only two cylinders and pistons since the pistons will be pushed back into the cylinder by the working fluid entering the side of the cylinder where the piston is attached to the connecting rod. This is because there is less of a need to maintain the speed of the engine to ensure that the pistons will travel back into the cylinders than is necessary when a power a return stroke is not utilized. Accordingly, without utilizing the power return stroke and only utilizing forward power stroke, it is preferable that the engine include at least three cylinders.

Due to the slow moving nature of the pistons in an engine according to the present invention, it may be necessary to include three pistons to ensure that the pistons will complete their return stroke. With three pistons, at least one piston will always be in a power stroke, to help ensure that other piston will help complete their return stroke. This occurs because the one piston is always in the power stroke will be furthering the rotation of the crank shaft thereby helping to move the other pistons along their return stroke.

However, an engine according to the present invention may include any number of cylinders. For instance, engines can be built with 16, 20, or more cylinders for larger electric power plant operations.

The crank shaft is interconnected with a load. The load could be a mechanical device driven by the crank shaft. Another example of a load could be an electric generator that is driven by the crank shaft. The crank shaft is also connected to a water valve 122 that controls the flow of high and low temperature liquid and/or gas into the heat exchangers.

The cylinders 100, 102, and 104 are each interconnected via a high pressure hose, 124, 126, and 128, respectively, to a working fluid container, 130, 132, and 134, respectively. The working fluid containers 130, 132, and 134 are enclosed within heat exchangers 136, 138, and 140, respectively. The working fluid may be contained within the space defined by the heat exchangers 130, 132, and 134, the high pressure connectors 124, 126, and 128 and the interior of the cylinders 100, 102, and 104. Of course, in embodiments that include a fluid containment system, the working fluid is contained within the working fluid container. As is evident, in embodiments without the working fluid containment system, the space that the working fluid is contained in changes volume as the piston moves within the cylinder.

FIG. 6 shows a series of depictions of the three cylinder engine shown in FIG. 5 as the cylinders cycle. In the embodiment shown in FIG. 6, 141 represents an off-center lobe cam with rocker arm lever and/or push rods to push open water valves. The cam shaft controls the flow of heat and cooling to the working fluid. Each cylinder/heat exchanger/working fluid container is represented by 1, 2, and 3.

The flow of heating and cooling is represented by high temperature water flow into the system 142, low temperature into the system, 144, high temperature return 146, and low temperature return 148. Flow from the source of high temperature to the system is represented by 150, the flow of low temperature from the low temperature source to the system is 152, the flow from the system to the source of high temperature is represented by 154, and the flow from the system to the source of low temperature is represented by 156.

As the cylinders cycle as shown in FIG. 6, the high and low temperature fluid flows in and out of the heat exchangers depending upon whether the particular cylinder involved is moving in one direction or another. As shown in FIG. 5, the opening and closing of the valves directing high and low temperature fluid into the heat exchanger may be controlled by a cam shaft directly or indirectly connected to a crank shaft driven by the cylinders.

An indirectly connected cam shaft could be connected to the crank shaft with a timing chain type connection. Of course, any connection could be used to connect the cam shaft to the crank shaft. The cam shaft could be an off-center lobe cam with rocker arm lever and/or push rods to push open water valves leading to the heat exchangers.

FIG. 7 shows an embodiment of a thermal hydraulic engine according to the present invention that includes four cylinders 158, 160, 162, and 164. The valves 166 and 168 transmitting hot and cold fluid to and from the heat exchanger are directly controlled by the crank shaft 170. In FIG. 7, piston 158 is in the process of beginning its power stroke. Hot fluid is flowing into heat exchanger 172 associated with piston 158 and also being withdrawn from heat exchanger 172.

Circulating pumps may be driven directly from the crankshaft power directly or indirectly. Indirectly driven circulation pumps could be driven through hydraulic pumps and/or motors.

The cooler fluid, in this case water used to cool the working fluid may be obtained from water pumped out of a well by the engine. As is seen in the embodiment shown in FIG. 4, the engine, through a transmission, drives a pump that pumps water from a water source, such as an underground well. An embodiment such as that shown in FIGS. 2 and 4 may be self sufficient and not require any outside power. Of course, such an embodiment could be connected to a power line to drive the pump during times of insufficient light, whether during cloudy days or at night. Alternatively, batteries could be provided to drive the circulation pump at such times.

FIG. 1 shows a general schematic drawing of a power plant utilizing a thermal hydraulic engine according to the present invention. In general, such a power plant includes a high temperature source 1, a low temperature source 3, a heat exchanger 5, a thermal hydraulic engine 7, which, in this case, refers to the working fluid and cylinders themselves, a transmission 9 of some type, perhaps a flywheel 11 to maintain the momentum of the engine, and an electric generator 13. Of course, the power plant need not necessarily include a flywheel and need not derive an electric generator. The power plant could also include additional components not shown in FIG. 1 and/or not included in the embodiment shown in FIG. 1.

Figure 2:
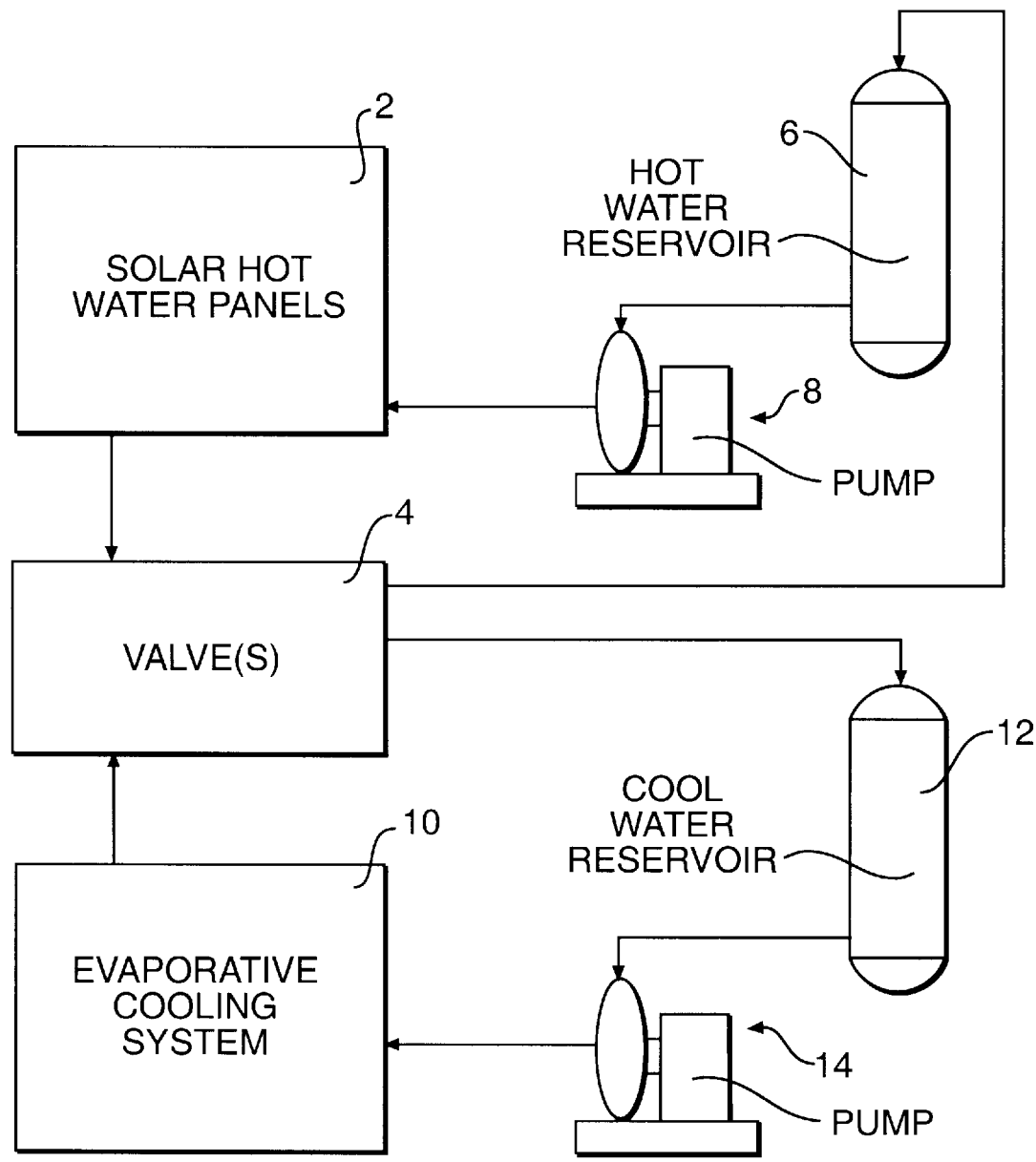
FIG. 2 represents a schematic diagram illustrating various components of an embodiment of a solar powered thermal hydraulic engine according to the present invention.

FIG. 2 shows an embodiment of a thermal hydraulic engine that utilizes solar energy to provide heat to heat the working fluid and an evaporative cooling system to remove heat from the working fluid. FIG. 2 illustrates the flow of heating and cooling water through the various components of the system. Of course, a material other than water may be utilized to heat and cool the working fluid.

As cooling water enters one heat exchanger associated with one cylinder, to draw heat out of the system, the hot water that is created as the cooling water absorbs heat from the working fluid may be recirculated to a hot water reservoir, if the system includes a reservoir.

The system shown in FIG. 2 includes solar hot water panels 2 to heat water that will cause the expansion of the working fluid. Water heated by the hot water panels will flow through at least one water directing valve 4 that directs the heated water to a hot water reservoir 6. From the hot water reservoir 6, the heated water will flow to a hot water pump 8. The hot water pump 8 will circulate the heated water to the thermal hydraulic engine (not shown) and then back to the solar hot water panels 2 to be heated again.

The embodiment shown in FIG. 2 also includes an evaporative cooling system 10 to provide water that is cooler than the water heated by the solar hot water panels 2 to remove heat from the working fluid. Water cooled by the evaporative cooling system 10 flows out of the evaporative cooling system through at least one water directing valve 4. The water directing valve directs the cooled water to a cool water reservoir 12. From the cool water reservoir 12, the cooled water will flow to a cool water pump 14. The cool water pump 14 will circulate the cooled water to the thermal hydraulic engine (not shown) and then back to the evaporative cooling system 10 to be cooled again.

Figure 3:
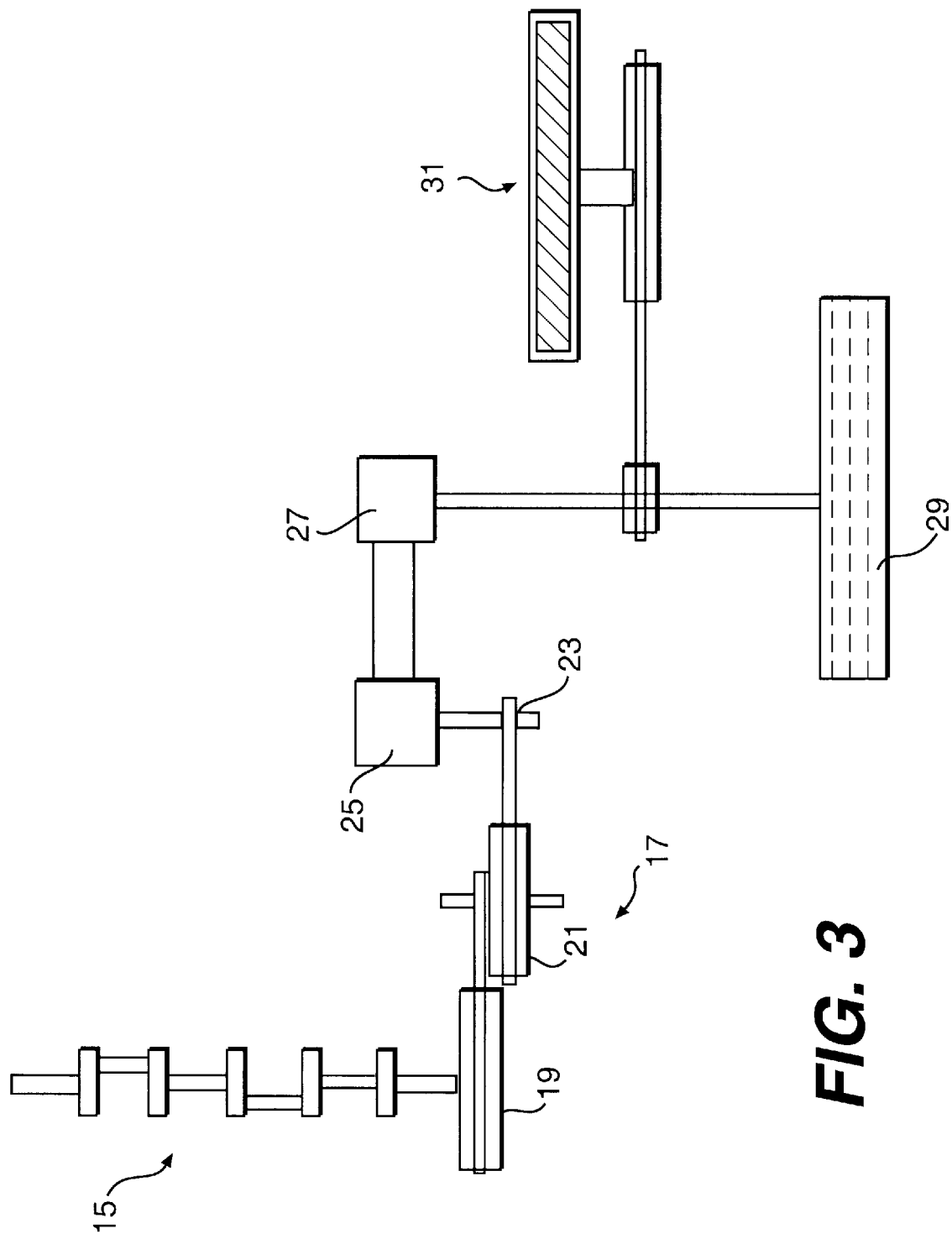
FIG. 3 represents an overhead view of various components that may be driven by a thermal hydraulic engine according to the present invention, representing the "load" on the engine.

FIG. 3 shows an embodiment of the interconnection between the crank shaft 15, driven by the thermal hydraulic engine (not shown in FIG. 3), and the elements making up the load on the engine. In this embodiment, the crank shaft 15 is connected to a chain drive gear and sprocket 17 that includes two relatively large gears 19 and 21 connected to ultimately to a smaller gear 23. As can be appreciated, the rotation of the crank shaft 15 will be greatly magnified by the gear in the embodiment shown in FIG. 3. FIG. 3a shows an enlarged side view of the chain drive gear and sprocket 17, showing gears 19, 21, and 23 and chains 20 and 22 driven by and driving the gears.

The chain drive gear may be connected to a hydraulic pump 25 and motor gear up 27 which is ultimately connected to an electric generator 29. A flywheel 31 may be interconnected between the hydraulic pump and motor gear up to help maintain the cycling of the engine.

Figure 4:
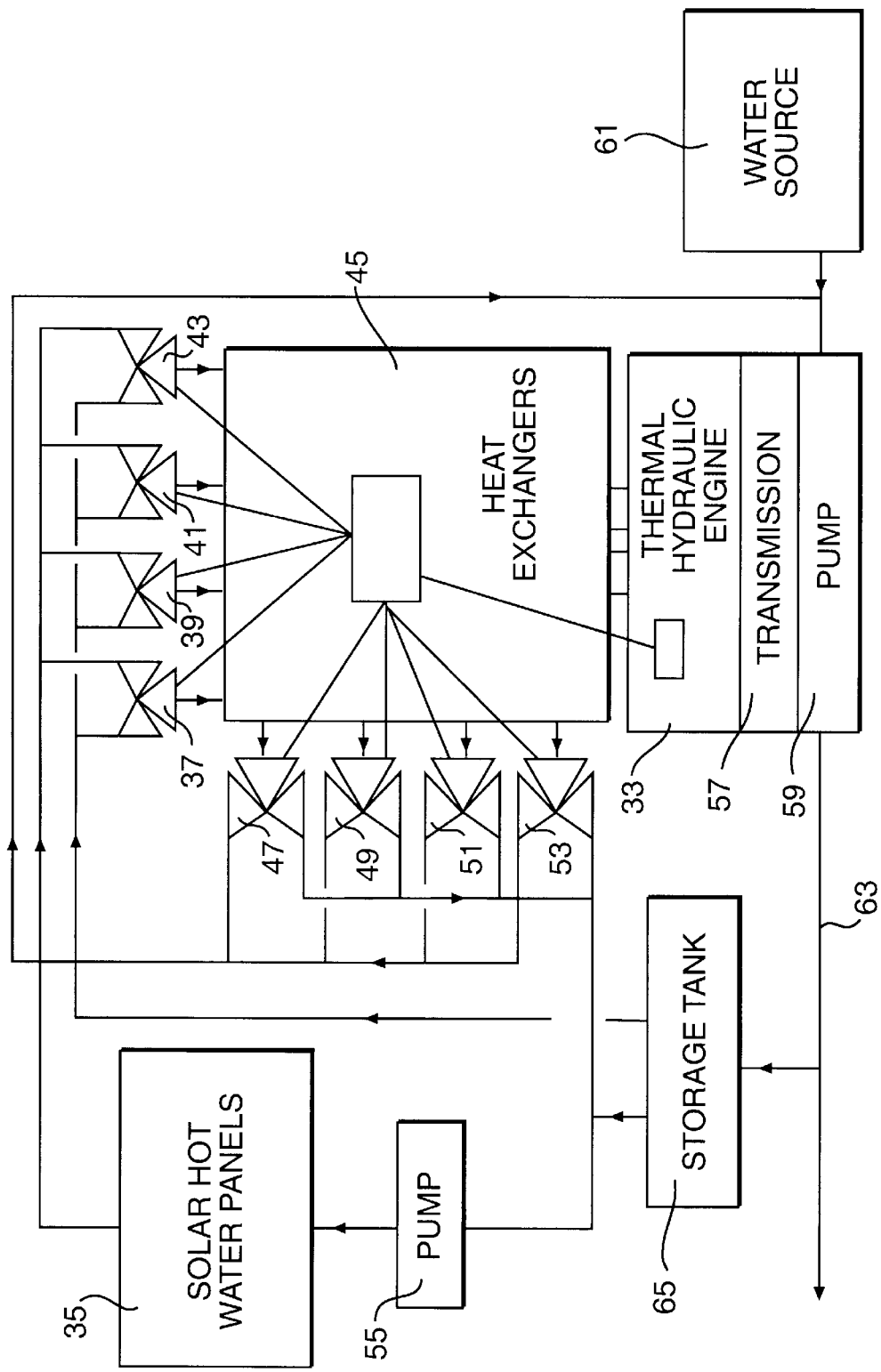
FIG. 4 represents a schematic diagram illustrating various components of another embodiment of a solar powered thermal hydraulic engine according to the present invention utilized to drive a water pump.

FIG. 4 represents a schematic view of another embodiment of a solar powered thermal hydraulic engine and some associated elements according to the present invention. Heat is delivered to and removed from the working fluid by relatively hotter and cooler water. As with any embodiment, a material other than water may be used to deliver heat to and remove heat from the working fluid. FIG. 4 also shows the flow of heated water through the system.

The embodiment shown in FIG. 4 includes the thermal hydraulic engine 33. Solar panels 35 provide the heat that heats the working fluid in the engine. The heated water then travels to a series of valves 37, 39, 41, and 43. The number of valves may depend upon the number of cylinders in the engine, the number of heat exchangers, and how the water is distributed to the heat exchangers and cylinders, among other factors.

The valves 37, 39, 41, and 43 deliver the water to the heat exchanger(s) 45. The heated water then heats the working fluid in the engine 33. After delivering its heat to the working fluid, the heated water is directed through valves 47, 49, 51, and 53 and then back to the solar array 35.

A circulating pump 55 drives the flow of the heated water. The circulation pump 55 may be powered by electricity generated by photovoltaic cells (not shown).

The thermal hydraulic engine 33 may be connected to transmission 57. In this embodiment, the engine 33 drives a pump 59. The pump 59 may be utilized to pump water from a water source 61. The water source 61 may include a well, reservoir, or tank, among other sources. The water may be pumped from the water source 61 into a water storage pipeline 63.

Water from the water source 61 may be utilized as the source of cooling water for cooling the working fluid as well as a source of water to be heated to provide heat to the working fluid. Water for either function may be stored in a storage tank 65.

Figure 21:
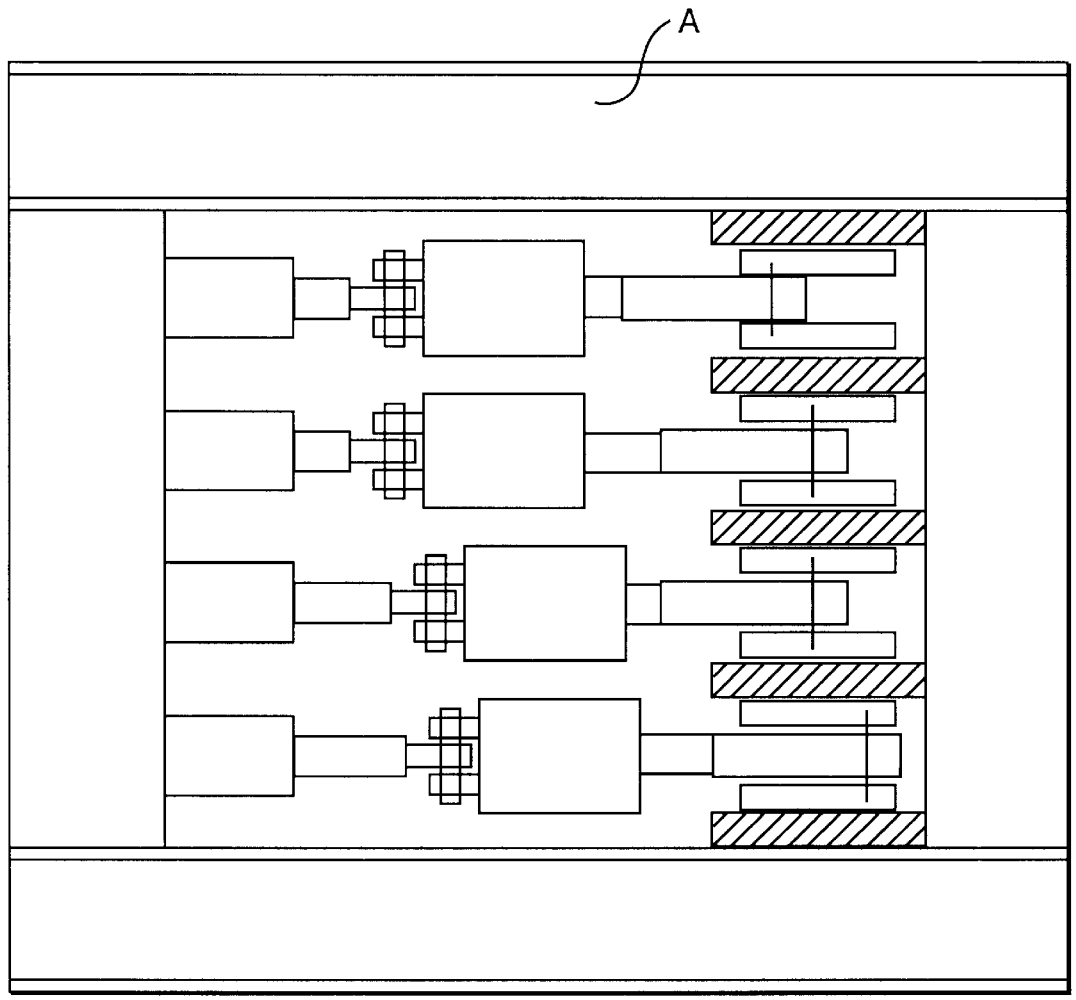

The components of the engine according to the present invention may mounted on a frame. FIG. 21 shows an embodiment of a thermal hydraulic engine according to the present invention that includes four cylinders wherein the components of the engine are mounted to a frame A.

To simplify the explanation of the operation of the present invention, the functioning of a three cylinder engine according to the present invention will be described. FIG. 5 shows an example of such an embodiment. The working fluid is contained within the cylinder and the working fluid container is surrounded by the heat exchanger. Therefore, in a sense, the heat exchanger acts as a containment system.

Given the fact that there are three cylinders 67, 69, and 71 and three pistons 73, 75, and 77 in the embodiment described here, each piston preferably powers the crank shaft 79 about a rotation of at least 120°, so that one piston is always in operation powering the crank shaft rotation. The operation of the engine will be described with the assumption that one piston will be starting its power stroke.

To begin the power stroke, the working fluid must be heated. The embodiment shown in FIG. 5 includes three heat exchangers 132, 136, and 138 to introduce heat to and remove heat from the working fluid. The difference between the working fluid in a heated state and a cool state may vary, depending upon the embodiment. According to one embodiment, the difference between the high temperature of the working fluid and the low temperature of the working fluid is about 40–60° F. However, the differential between the high and low temperatures of the working fluid may be larger or smaller.

The high temperature of the working fluid may be anywhere from about 80–200° F. The range of temperatures of the high temperature of the working fluid may also be from about 120–140°. However, any temperature for the high temperature of the working fluid could be utilized as long as it is higher than the lower temperature of the working fluid. In fact, super-heated water above 212° F. could also be utilized.

The low temperature of the working fluid could vary from about 35° F. to about 85° F. According to one embodiment the low temperature may be from about 70° to about 85° F.

However, as stated above regarding the high temperature, the low temperature of the working fluid may be any temperature, as long as it is lower than the high temperature of the working fluid. The greater the differential in the high and low temperatures, the greater the possibility for heating the cooling the working fluid.

The temperature of the working fluid may also be defined by defining the highest temperature of the working fluid relative to the lowest temperature of the working fluid. Accordingly, the difference in temperatures of the working fluid may be up to about 60° C. Alternatively, the difference in temperatures of the working fluid may be between about 60° C. and about 120° C. Other ranges for the difference in temperatures of the working fluid include between about 120° C. and about 180° C. and between about 180° C. and about 240° C.

Prior to starting the operation of the engine, the working fluid may be pressurized to help maintain a seal between the piston and the wall of the cylinder. A positive pressure maintained in the cylinder may help to force a seal in the area between the piston and the cylinder. For example, the working fluid could be pre-pressurized to about 200 lbs. per square inch. If the working fluid is pre-pressurized, it may be pressurized to an extent such that during the contraction of the working fluid as heat is removed from the working fluid, the pressure within the cylinder never drops below 0. However, it is not necessary that the working fluid be pre-pressurized at all.

Figure 10:
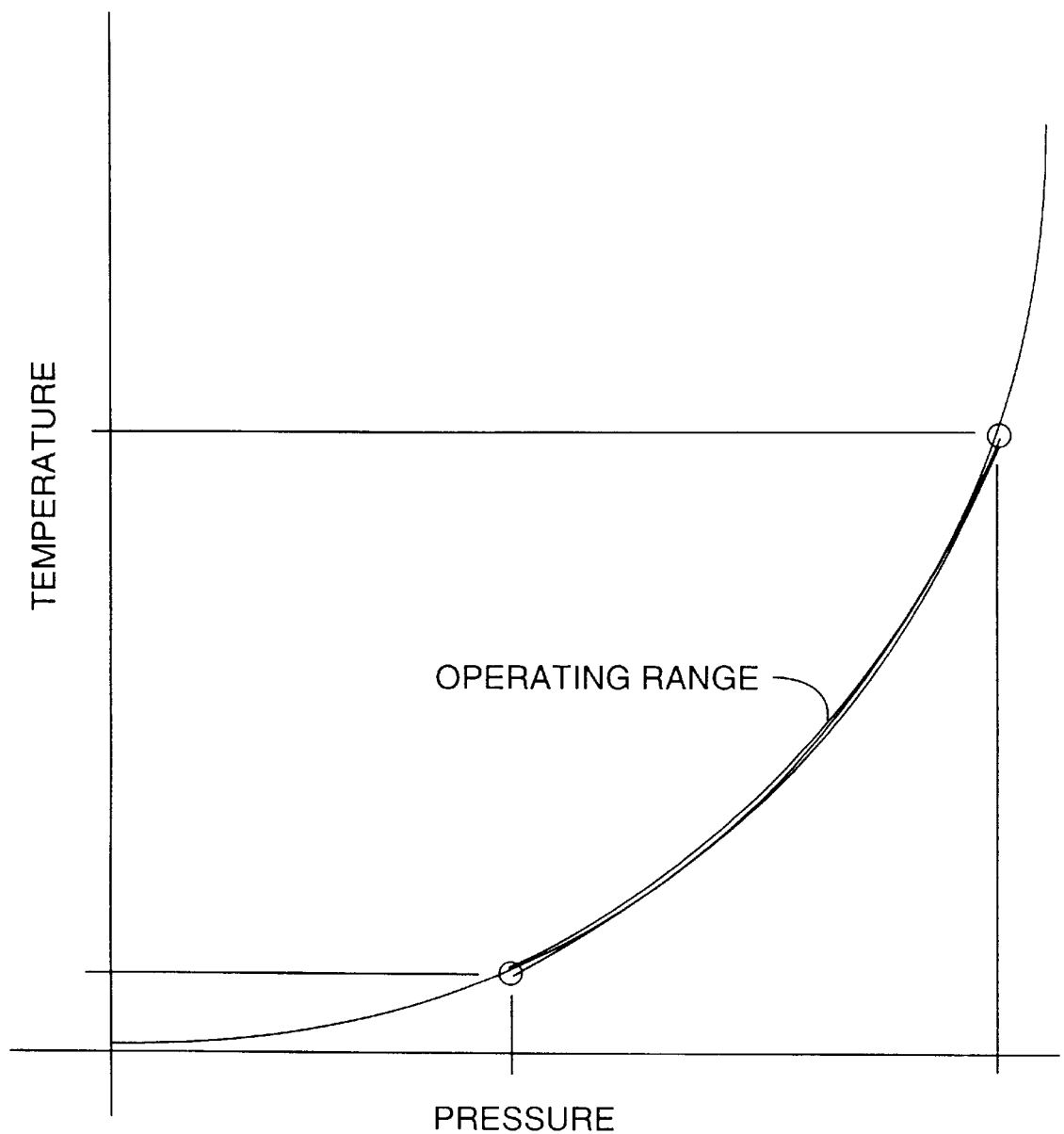
FIG. 10 represents a graph showing operating ranges of temperatures and pressures of a working fluid utilized in an embodiment of a thermal hydraulic engine according to the present invention.

FIG. 10 represents a graph showing the operating range of temperatures and pressures that an embodiment of a thermal hydraulic engine utilizing a working fluid.

Figure 8:
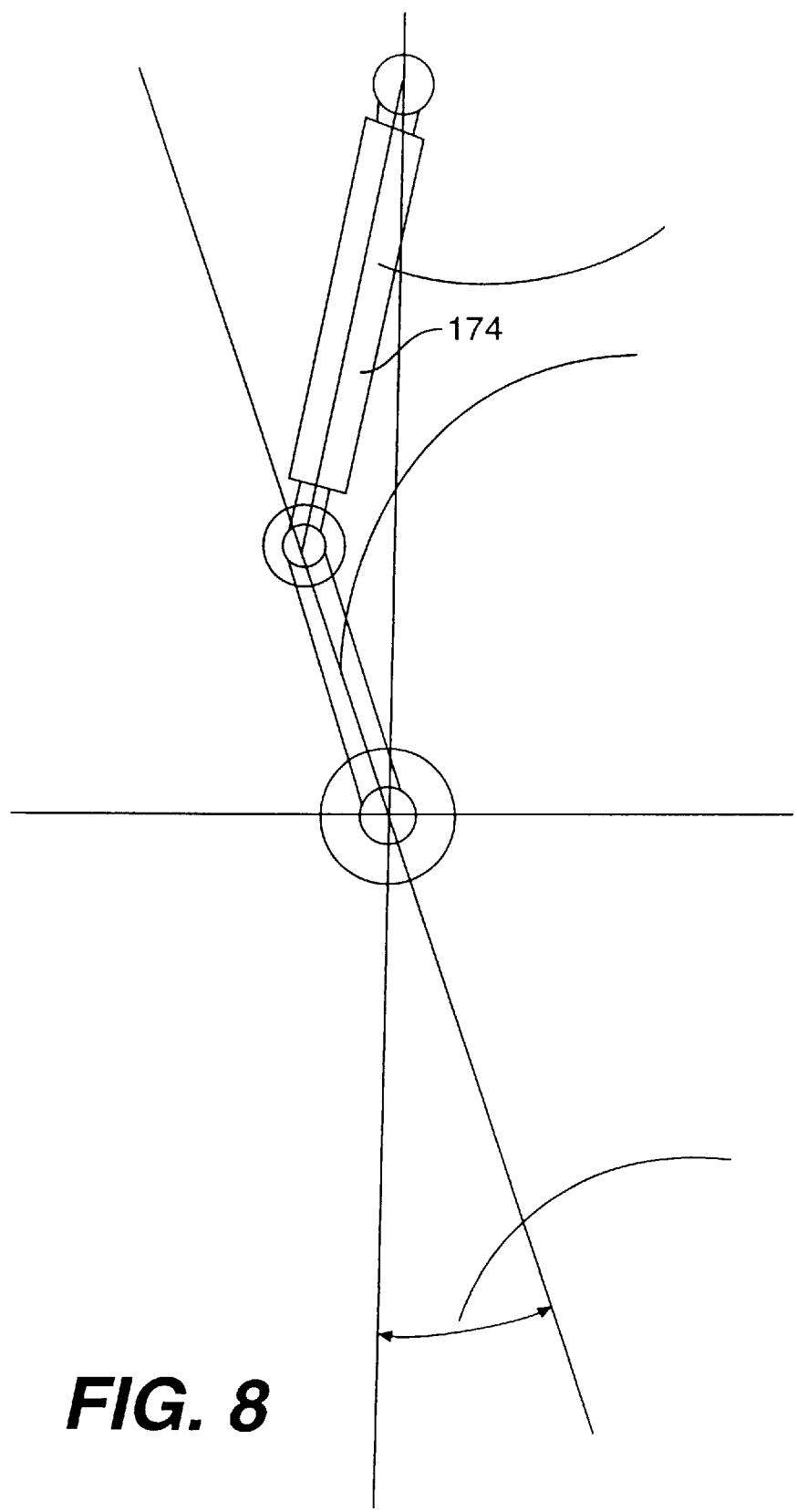
FIG. 8 represents the position of a piston at the beginning of a power stroke of a piston of an embodiment of a thermal hydraulic engine according to the invention.

As the working fluid is heated and it starts to expand, the force of the fluid is transmitted to the piston, thereby moving the piston. According to one embodiment of the present invention including three cylinders, the rotation of the crank shaft does not begin until the connecting rod 174 has moved to a point about 20° past top dead center as shown in FIG. 8.

As stated above, in a three cylinder embodiment, the piston must power the crank shaft around at least 120° since there are three pistons and 360° in a complete rotation of the crank shaft. Similarly, in a four cylinder engine, each piston must power the crank shaft about 90°. The corresponding number of degrees that the piston must power the crank shaft rotation may be calculated simply by dividing 360° by the number of pistons.

Given the fact that the rotation of the crank does not commence until the connecting rod has moved about 20° beyond top dead center, the calculation of the 120° of the power stroke of the piston will be calculated from this 20° starting point of the rotation. However, the power stroke of the next piston will be started upon the connecting rod reaching 120° beyond top dead center. Therefore, there will a 20° overlap between the power stroke of the first cylinder and the second cylinder. This will help to ensure a smooth transition between pistons with the effective turning force being transmitted to and from the crank shaft being maintained thoroughly constant. The smooth transition of power is assisted by the fact that as any piston is traveling through its power stroke, it not only powers the rotation of the crank shaft or other device that harnesses the movement of the piston but it may also help to drive the other pistons in the engine on their return stroke.

Figure 9:
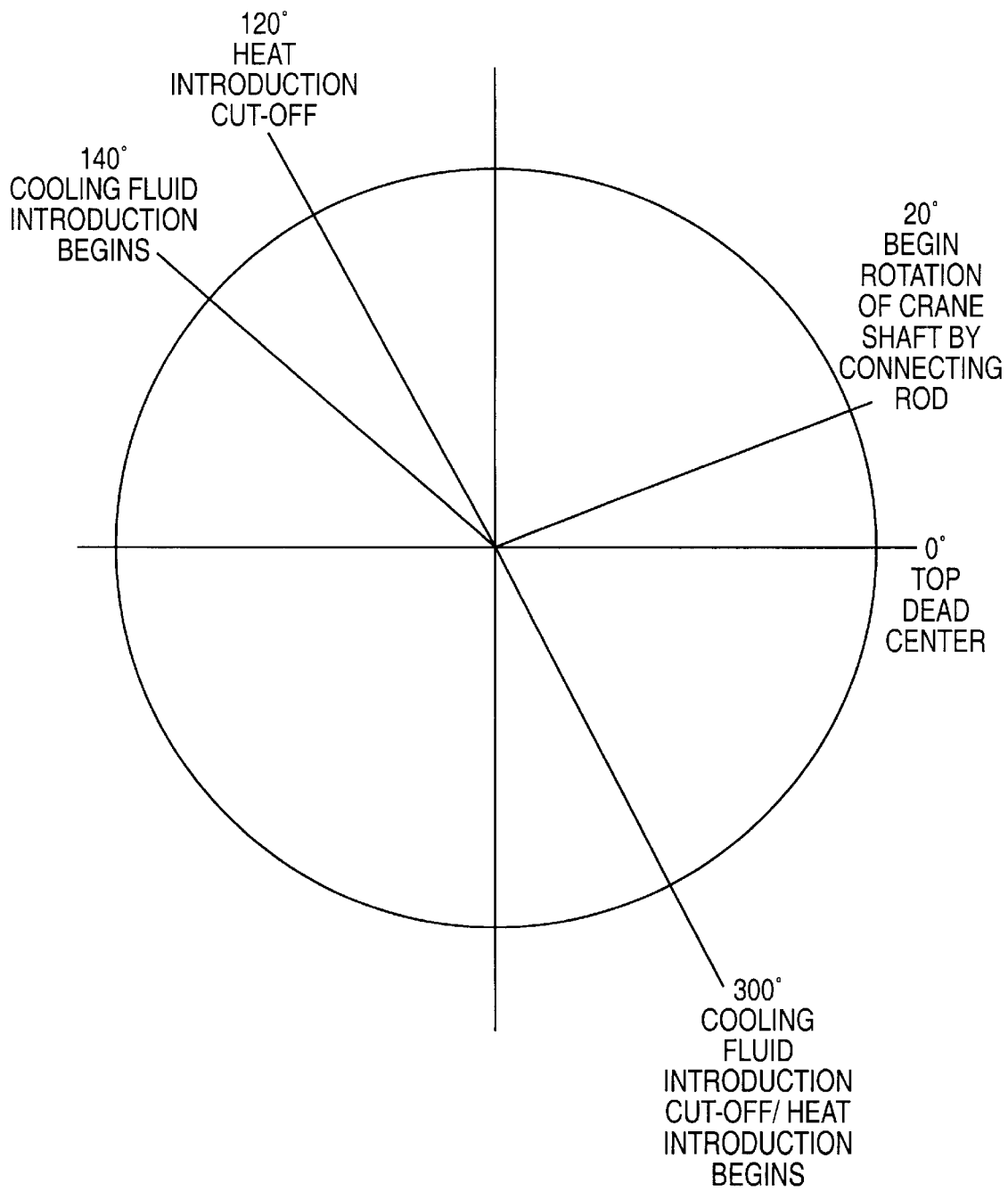
FIG. 9 represents the rotational location of a crank shaft in a thermal hydraulic engine according to the present invention, indicating the various positions of the crank shaft relative to the expansion and contraction of the working fluid and introduction and removal of heat from the working fluid.

As shown in FIG. 9, the heat source associated with the first cylinder preferably is cut off when the connecting rod reaches about 120° beyond top dead center, according to this embodiment. Next, the source of cool fluid is started into the heat exchanger when the connecting rod reaches about 140° beyond top dead center. As the return stroke of the first piston continues and the rotation of the connecting rod and crank shaft continue, when the connecting rod reaches about 300° beyond top dead center, the source of cold fluid to the heat is turned off and the source of high temperature fluid to the heat exchanger is started again.

The points at which the sources of high and low temperature fluid are introduced into the heat exchanger may vary, depending upon the embodiment of the invention. One factor that may alter the flow of the high and low temperature fluid into the exchanger is whether or not the working fluid is pre-pressurized as described above. The speed of the movement of the piston and, hence, the crank shaft may be increased by increasing the flow of high temperature fluid into the heat exchanger. The speed of operation of the engine and the horse-power output may also be increased by increasing the temperature differential between high and low temperature fluids introduced into the heat exchanger and, hence the working fluid.

At the 300° rotation point, when the source of high temperature fluid is reintroduced into the heat exchanger, the working fluid has come back to its base temperature pressure and volume. It is these volume, temperature and pressure parameters that are utilized to calculate the engine size, flow of high and low temperature fluid to the heat exchanger, engine load, cylinder size, cylinder number, and many other operating and design parameters of the invention.

The flow of high and low temperature fluid into the heat exchanger described above may be controlled in a variety of ways. For instance, a timing gear may be directly or indirectly connected to the crank shaft. The timing gear may then mechanically actuate valves that control the flow of high and low temperature fluid into the heat exchanger based upon the position of the crank shaft. Alternatively, a cam shaft rotated by the crank shaft may operate an electrical system that electrically controls the flow of high and low temperature fluid into the heat exchanger.

Other methods that may be utilized to control the flow of high and low temperature fluid into the heat exchanger can include lasers, computer programs, optical devices, mechanical push rods, connecting rods, levers, or other manual and/or automatic devices. As will be appreciated, a complex computer control could optimize the operation of a thermal hydraulic engine according to the embodiment, just as electronic control has helped to optimize the operation of internal combustion engines in modern automobiles. A complex electronic control system can simultaneously monitor and control a wide variety of parameters, optimizing the operation of the engine.

This disclosure showns and describes only the preferred embodiments of the invention. As aforementioned, it is to be understood that the invention is capable of using various other combinations and other environments and is capable of changes or modifications within the scope of the inventive concept as expressed herein. Accordingly, the embodiments described above are merely illustrative and not exhaustive in nature.

I claim:

1. A thermal hydraulic engine, comprising:
   a frame;
   a working liquid that changes volume with changes in temperature;
   a working liquid container for housing said working liquid;
   a cylinder secured to said frame and including an interior space, said cylinder also including a passage for introducing said working liquid into said interior space;
   a piston housed within said interior space of said cylinder, said working liquid container, said interior space of said cylinder, said piston, and said working liquid container defining a closed space filled by said working liquid;
   a connecting rod connect to said piston;
   a crankshaft connected to said connecting rod; and
   means for controllably transmitting heat to and removing heat from said working liquid, thereby cyclically alternately causing said working liquid to expand and contract without undergoing a phase change, said piston moving in response to said expansion and contraction of said working liquid, said expansion and contraction of said working liquid being unobstructed by valves.

2. A thermal engine according to claim 1, further comprising:
   a working liquid transfer section between said working liquid container and said interior space of said cylinder, said working liquid container, said working liquid connection, said interior space of said cylinder and said piston defining a closed space filled by said working liquid.

3. A thermal hydraulic engine according to claim 1, further comprising:
   a plurality of cylinders, each of said cylinders housing a piston, a plurality of working fluid containers interconnected with said cylinders, and a plurality of heat transmitting means interconnected with said working fluid containers and said cylinders.

4. A thermal hydraulic engine according to claim 1, further comprising:
   means for mounting said cylinder to said frame, said mounting means permitting said cylinder to slide and articulate relative to said frame, said mounting means including a connecting rod provided on said cylinder, said connecting rod being articulately secured to a member slidably mounted to said frame, said slidable member sliding in a direction perpendicular to a crankshaft interconnected with said connecting rod.

5. A thermal hydraulic engine according to claim 1, further comprising a water jacket that surrounds said working liquid container, said water jacket including an input and output for water of different temperatures to impart or remove heat from said working liquid through said heat exchanger.

6. A thermal hydraulic engine according to claim 1, further comprising:
   a camshaft, wherein movement of said camshaft is controlled by said crankshaft and controls opening and closing of valves or opening and closing microswitches that activate solenoid valves for controlling transmission of heat to and removal of heat from said working fluid.

7. A thermal hydraulic engine according to claim 6, wherein said connecting rod is articulately attached to said piston.

8. A thermal hydraulic engine according to claim 6, wherein said connecting rod is immovably affixed to said piston and said cylinder is articulately mounted on said frame.

9. A thermal hydraulic engine according to claim 6, further comprising:

transmission means to increase or step up speed from the crankshaft.

10. A thermal hydraulic engine according to claim 6, further comprising:
at least one seal between an outer surface of said piston and an inner surface of said interior space of cylinder.

11. A thermal hydraulic engine according to claim 1, wherein said heat transmitting means is capable of raising a temperature of said working liquid to produce a high temperature of between about 120° and about 140° F., and said heat transmitting means is capable of reducing a temperature of said working liquid to produce a low temperature of between about 70° and about 85° F.

12. A thermal hydraulic engine according to claim 1, wherein said heat transmitting means is capable of raising a temperature of said working liquid to produce a high temperature of between about 80° and about 200° F., and said heat transmitting means is capable of reducing a temperature of said working liquid to produce a low temperature of between about 35° and about 140° F.

13. A thermal hydraulic engine according to claim 1, further comprising:
two connecting rods attached to opposite sides of said piston; and
two crankshafts, one attached to each of said connecting rods.

14. A thermal hydraulic engine according to claim 1, wherein said piston and said interior space of said cylinder define two closed spaces filled by said working liquid, said cylinder further including:
a main inlet port in the vicinity of a first end of said cylinder;
a secondary inlet port in the vicinity of a second end of said cylinder; and
means for sealing a space between said cylinder and said connecting rod;
said thermal hydraulic engine including at least one seal between an outer surface of said piston and an inner surface of said interior space of cylinder;
wherein expansion of said working liquid is utilized to alternately move said piston in opposite directions.

15. A thermal hydraulic engine according to claim 1, wherein said working liquid is pressurized.

16. A thermal hydraulic engine according to claim 1, further comprising means for mounting said cylinder to said frame, said mounting means permitting said cylinder to slide and articulate relative to said frame, said mounting means including a connecting rod provided on said cylinder, said connecting rod being articulately secured to a member slidably mounted to said frame, said slidable member sliding in a direction parallel to said cylinder.

17. A thermal hydraulic engine according to claim 1, further comprising at least one spring biasing said piston to move in a direction opposite to a direction that expansion of said working liquid causes said piston to move.

18. A thermal hydraulic engine, comprising:
a frame;
a first working liquid that changes volume with changes in temperature;
a working liquid container for housing said first working liquid;
a flexible diaphragm provided at one end of said working liquid container, said flexible diaphragm moving in response to expansion and contraction of said working liquid;
a reservoir for housing a second working liquid in contact with said flexible diaphragm;
means for transmitting heat to and removing heat from said first working liquid, thereby alternately causing said working liquid to expand and contract, expansion and contraction of said first working liquid causing movement of said flexible diaphragm, movement of said flexible diaphragm causing movement of said second working liquid;
a cylinder secured to said frame and including an interior space, said cylinder also including a passage for introducing said second working liquid into said interior space;
a piston housed within said interior space of said cylinder, said working liquid reservoir, said interior space of said cylinder, and said piston defining a closed space filled by said second working liquid.

19. A thermal hydraulic engine, comprising:
a frame;
a working fluid that changes volume with changes in temperature;
a working fluid container for housing said working fluid;
a cylinder secured to said frame and including an interior space, said cylinder also including a passage for introducing said working fluid into said interior space;
a piston housed within said interior space of said cylinder, said working fluid container, said interior space of said cylinder, said piston, and said working fluid container defining a closed space filled by said working fluid;
means for transmitting heat to and removing heat from said working fluid, thereby alternately causing said working fluid to expand and contract without undergoing a phase change, said piston moving in response to said expansion and contraction of said working fluid;
a connecting rod attached to said piston;
a crankshaft attached to said connecting rod; and
a camshaft, wherein movement of said camshaft is controlled by said crankshaft and controls opening and closing of valves or opening and closing microswitches that activate solenoid valves for controlling transmission of heat to and removal of heat from said working fluid.

20. A thermal hydraulic engine according to claim 19, wherein said connecting rod is articulately attached to said piston.

21. A thermal hydraulic engine according to claim 19, wherein said connecting rod is immovably affixed to said piston and said cylinder is articulately mounted on said frame.

22. A thermal hydraulic engine according to claim 19, further comprising:
transmission means to increase or step up speed from the crankshaft.

23. A thermal hydraulic engine according to claim 19, further comprising:
at least one seal between an outer surface of said piston and an inner surface of said interior space of cylinder.

* * * * *

UNITED STATES PATENT AND TRADEMARK OFFICE
CERTIFICATE OF CORRECTION

PATENT NO. : 5,899,067
DATED : May 4, 1999
INVENTOR(S) : Brian C. Hageman

It is certified that error appears in the above-identified patent and that said Letters Patent is hereby corrected as shown below:

Claim 1,
Line 9, delete "connect" and insert -- connected --.

Signed and Sealed this

Eleventh Day of December, 2001

Attest:

*Nicholas P. Godici*

NICHOLAS P. GODICI
*Attesting Officer*   *Acting Director of the United States Patent and Trademark Office*